(12) United States Patent
Naito

(10) Patent No.: US 10,402,886 B2
(45) Date of Patent: Sep. 3, 2019

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventor: Carrie Naito, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 328 days.

(21) Appl. No.: 15/306,781

(22) PCT Filed: Jun. 23, 2014

(86) PCT No.: PCT/JP2014/066557
§ 371 (c)(1),
(2) Date: Oct. 26, 2016

(87) PCT Pub. No.: WO2015/198376
PCT Pub. Date: Dec. 30, 2015

(65) Prior Publication Data
US 2017/0053337 A1 Feb. 23, 2017

(51) Int. Cl.
*G06Q 30/06* (2012.01)
*G06Q 10/08* (2012.01)
*G06F 16/2457* (2019.01)

(52) U.S. Cl.
CPC ... *G06Q 30/0631* (2013.01); *G06F 16/24573* (2019.01); *G06Q 10/087* (2013.01)

(58) Field of Classification Search
USPC .......................................................... 705/28
See application file for complete search history.

(56) References Cited

U.S. PATENT DOCUMENTS 7,295,995 B1 * 11/2007 York ................. G06Q 30/02
   705/26.8
7,424,439 B1 * 9/2008 Fayyad ............. G06Q 30/0204
   705/7.33
(Continued)

FOREIGN PATENT DOCUMENTS

EP   2096597 A2 *  9/2009 ............. G06Q 10/04
EP   2202656 A1 *  6/2010 ......... G06F 16/9535
(Continued)

OTHER PUBLICATIONS

International Search Report for PCT/JP2014/066557 dated Aug. 12, 2014 [PCT/ISA/210].

*Primary Examiner* — Ashford S Hayles
(74) *Attorney, Agent, or Firm* — Sughrue Mion, PLLC

(57) ABSTRACT

A tag database stores tag information corresponded to respective user identification information, shop identification information, and merchandise identification information. A tag management unit execute a tag mutual assignment process on a tag database that realizes a state where tag information is mutually assigned between user identification information and either shop identification information or merchandise identification information related to a mutual assignment target action. A tag processing unit, in response to a tag process target action in the user terminal, searches the tag database for tag information corresponded to user identification information, shop identification information, or merchandise identification information regarding the tag process target action, and acquires, based on extracted tag information, tag information or identification information used for generating presentation information to be transmitted to the user terminal. A presentation information gener- (Continued)

ating unit, using the tag information or identification information acquired by the tag processing unit, generates the presentation information.

17 Claims, 16 Drawing Sheets

(56) References Cited

U.S. PATENT DOCUMENTS

| | | | | |
|---|---|---|---|---|
| 7,590,616 | B2* | 9/2009 | Guan | G06Q 30/02 |
| 7,966,219 | B1* | 6/2011 | Singh | G06Q 30/02 |
| | | | | 705/26.7 |
| 8,065,254 | B1* | 11/2011 | Das | G06F 16/951 |
| | | | | 706/46 |
| 8,214,264 | B2* | 7/2012 | Kasavin | G06Q 30/02 |
| | | | | 705/26.7 |
| 8,751,470 | B1* | 6/2014 | Garg | G06F 16/951 |
| | | | | 707/705 |
| 9,092,211 | B2* | 7/2015 | Ng | G06F 8/30 |
| 9,183,587 | B1* | 11/2015 | Rosner | G06Q 30/0641 |
| 9,508,087 | B1* | 11/2016 | Liu | G06Q 30/0251 |
| 2002/0010625 | A1* | 1/2002 | Smith | G06Q 30/02 |
| | | | | 705/14.52 |
| 2002/0052873 | A1* | 5/2002 | Delgado | G06Q 30/02 |
| 2002/0091591 | A1* | 7/2002 | Tsumura | G06Q 10/087 |
| | | | | 705/28 |
| 2002/0130902 | A1* | 9/2002 | Shaouy | G06F 16/9535 |
| | | | | 715/745 |
| 2002/0156686 | A1* | 10/2002 | Kraft | G06Q 30/02 |
| | | | | 705/26.62 |
| 2003/0005046 | A1* | 1/2003 | Kavanagh | G06Q 30/02 |
| | | | | 709/203 |
| 2003/0105682 | A1* | 6/2003 | Dicker | G06Q 30/02 |
| | | | | 705/26.8 |
| 2005/0210507 | A1* | 9/2005 | Hawkins | H04N 21/4825 |
| | | | | 725/46 |
| 2005/0262428 | A1* | 11/2005 | Little | G06F 16/9535 |
| | | | | 715/201 |
| 2006/0015504 | A1* | 1/2006 | Yu | G06F 16/951 |
| 2006/0136378 | A1* | 6/2006 | Martin | G06F 16/9535 |
| 2007/0038614 | A1* | 2/2007 | Guha | G06Q 30/02 |
| 2008/0065759 | A1* | 3/2008 | Gassewitz | G06Q 30/02 |
| | | | | 709/224 |
| 2008/0077471 | A1* | 3/2008 | Musgrove | G06Q 30/02 |
| | | | | 705/7.29 |
| 2008/0162574 | A1* | 7/2008 | Gilbert | G06Q 10/06375 |
| 2008/0228544 | A1* | 9/2008 | Woosley | G06Q 10/1095 |
| | | | | 705/7.19 |
| 2008/0270398 | A1* | 10/2008 | Landau | G06Q 30/02 |
| 2008/0294617 | A1* | 11/2008 | Chakrabarti | G06F 16/9535 |
| 2009/0037355 | A1* | 2/2009 | Brave | G06F 16/9535 |
| | | | | 706/45 |
| 2009/0100094 | A1* | 4/2009 | Verdaguer | G06F 16/735 |
| 2009/0113349 | A1* | 4/2009 | Zohar | G06Q 30/00 |
| | | | | 715/852 |
| 2009/0132345 | A1* | 5/2009 | Meyssami | G06Q 10/10 |
| | | | | 705/7.33 |
| 2009/0132459 | A1* | 5/2009 | Hicks | G06N 5/02 |
| | | | | 706/52 |
| 2009/0138296 | A1* | 5/2009 | Geiger | G06Q 30/02 |
| | | | | 705/14.54 |
| 2009/0171813 | A1* | 7/2009 | Byrne | G06Q 30/02 |
| | | | | 705/26.1 |
| 2009/0248494 | A1* | 10/2009 | Hueter | G06Q 10/00 |
| | | | | 705/7.29 |
| 2009/0313127 | A1* | 12/2009 | Chaiken | G06Q 30/02 |
| | | | | 705/14.72 |
| 2009/0327916 | A1* | 12/2009 | Baran | G06Q 30/02 |
| | | | | 715/745 |
| 2010/0076857 | A1* | 3/2010 | Deo | G06Q 30/00 |
| | | | | 705/26.1 |
| 2010/0114654 | A1* | 5/2010 | Lukose | G06Q 30/00 |
| | | | | 705/14.54 |
| 2010/0153210 | A1* | 6/2010 | Oh | G06Q 30/02 |
| | | | | 705/14.52 |
| 2010/0169342 | A1* | 7/2010 | Kenedy | G06F 16/9535 |
| | | | | 707/758 |
| 2010/0228558 | A1* | 9/2010 | Corcoran | G06Q 30/02 |
| | | | | 705/1.1 |
| 2010/0268661 | A1* | 10/2010 | Levy | G06Q 30/02 |
| | | | | 705/347 |
| 2011/0010324 | A1* | 1/2011 | Bolivar | G06N 5/02 |
| | | | | 706/46 |
| 2011/0055008 | A1* | 3/2011 | Feuerstein | G06Q 30/02 |
| | | | | 705/14.51 |
| 2011/0131485 | A1* | 6/2011 | Bao | G06Q 30/02 |
| | | | | 715/243 |
| 2011/0225019 | A1* | 9/2011 | Taylor | G06Q 10/0635 |
| | | | | 705/7.28 |
| 2011/0246293 | A1* | 10/2011 | Hayward | G06Q 30/0207 |
| | | | | 705/14.51 |
| 2011/0246312 | A1* | 10/2011 | Meek | G06Q 30/02 |
| | | | | 705/14.73 |
| 2011/0302117 | A1* | 12/2011 | Pinckney | G06Q 30/02 |
| | | | | 706/12 |
| 2012/0072813 | A1* | 3/2012 | Chandra | G06F 12/0888 |
| | | | | 715/200 |
| 2012/0084282 | A1* | 4/2012 | Chiang | G06F 16/951 |
| | | | | 707/725 |
| 2012/0130819 | A1* | 5/2012 | Willcock | G06Q 30/02 |
| | | | | 705/14.66 |
| 2012/0144022 | A1* | 6/2012 | Porter | G06Q 30/0201 |
| | | | | 709/224 |
| 2012/0166377 | A1* | 6/2012 | Sathish | G06N 5/025 |
| | | | | 706/47 |
| 2012/0221411 | A1* | 8/2012 | Graham, Jr. | G06Q 30/02 |
| | | | | 705/14.52 |
| 2012/0278127 | A1* | 11/2012 | Kirakosyan | G06Q 30/0631 |
| | | | | 705/7.29 |
| 2012/0290938 | A1* | 11/2012 | Subbarao | H04L 67/22 |
| | | | | 715/738 |
| 2012/0323682 | A1* | 12/2012 | Shanbhag | G06Q 30/0601 |
| | | | | 705/14.51 |
| 2012/0330734 | A1* | 12/2012 | Brown | G06Q 30/02 |
| | | | | 705/14.5 |
| 2013/0013448 | A1* | 1/2013 | Bradley | G06Q 30/02 |
| | | | | 705/26.7 |
| 2013/0030879 | A1* | 1/2013 | Munjal | G06Q 30/0207 |
| | | | | 705/7.42 |
| 2013/0036344 | A1* | 2/2013 | Ahmed | G06F 16/9535 |
| | | | | 715/205 |
| 2013/0124449 | A1* | 5/2013 | Pinckney | G06N 5/048 |
| | | | | 706/52 |
| 2013/0179223 | A1* | 7/2013 | Mohan | G06F 11/3438 |
| | | | | 705/7.33 |
| 2013/0246184 | A1* | 9/2013 | Flood | G06Q 30/02 |
| | | | | 705/14.66 |
| 2013/0282709 | A1* | 10/2013 | Zhu | G06F 16/3322 |
| | | | | 707/728 |
| 2013/0304607 | A1* | 11/2013 | Costa | G06Q 30/0631 |
| | | | | 705/26.7 |
| 2013/0332309 | A1* | 12/2013 | Sundaresan | G06Q 30/08 |
| | | | | 705/26.7 |
| 2014/0067530 | A1* | 3/2014 | Pluche | G06Q 30/0267 |
| | | | | 705/14.53 |
| 2014/0067596 | A1* | 3/2014 | McGovern | G06Q 30/02 |
| | | | | 705/26.7 |
| 2014/0108202 | A1 | 4/2014 | Masuko | |
| 2014/0180802 | A1* | 6/2014 | Boal | G06Q 30/0245 |
| | | | | 705/14.49 |
| 2014/0244447 | A1* | 8/2014 | Kim | G06Q 30/0254 |
| | | | | 705/27.2 |
| 2014/0282153 | A1* | 9/2014 | Christiansen | G06Q 30/0201 |
| | | | | 715/765 |
| 2015/0081469 | A1* | 3/2015 | Acharyya | G06Q 30/0631 |
| | | | | 705/26.7 |

(56) References Cited

U.S. PATENT DOCUMENTS

FOREIGN PATENT DOCUMENTS

| JP | 2013-077262 A | 4/2013 |
| JP | 2013-171500 A | 9/2013 |
| JP | 2013-534340 A | 9/2013 |
| WO | 2012/018388 A1 | 2/2012 |
| WO | 2013/145394 A1 | 10/2013 |

* cited by examiner

FIG. 4

USER U1

| USER ID | USUAL REGISTRATION TAG | | MUTUAL REGISTRATION TAG | | | | | | |
|---|---|---|---|---|---|---|---|---|---|
| | MALE | 18 | BUSINESS SHOES | 3 | SP-A | 10 | FREE SHIPPING | 6 |
| | IN THIRTIES | 3 | BELT | 2 | BR-A | 5 | GENUINE LEATHER | 3 |
| | JAPAN | 21 | JAZZ | 8 | PINK | 1 | BR-C | 2 |
| | . | | . | | . | | . | |
| | . | | . | | . | | . | |
| | . | | . | | . | | . | |

USER U2

| USER ID | USUAL REGISTRATION TAG | | MUTUAL REGISTRATION TAG | | | | | | |
|---|---|---|---|---|---|---|---|---|---|
| | FEMALE | 22 | BAG | 18 | RED | 25 | BR-B | 5 |
| | IN TWENTIES | 25 | SP-B | 3 | CREDIT CARD AVAILABLE | 3 | ASIAN MODE | 8 |
| | SINGAPORE | 3 | SP-C | 10 | SP-D | 9 | ORGANIC FOOD | 38 |
| | . | | . | | . | | . | |
| | . | | . | | . | | . | |
| | . | | . | | . | | . | |

FIG. 5

SHOP S1

| SHOP ID | USUAL REGISTRATION TAG | | MUTUAL REGISTRATION TAG | | | | | |
|---|---|---|---|---|---|---|---|---|
| | SP-A | 51 | CREDIT CARD AVAILABLE | 18 | MALE | 38 | FEMALE | 2 |
| | BAG | 30 | MADE IN JAPAN | | IN FIFTIES | 26 | SP-B | 3 |
| | TOKYO | 18 | BR-A | | ORGANIC FOOD | 18 | BLUE | 8 |
| | . | | . | | . | | . | |
| | . | | . | | . | | . | |
| | . | | . | | . | | . | |

SHOP S2

| SHOP ID | USUAL REGISTRATION TAG | MUTUAL REGISTRATION TAG | | | |
|---|---|---|---|---|---|
| | . | . | . | . | . |
| | . | . | . | . | . |
| | . | . | . | . | . |

MERCHANDISE M1

| MERCHANDISE ID | USUAL REGISTRATION TAG | | MUTUAL REGISTRATION TAG | | | | | |
|---|---|---|---|---|---|---|---|---|
| | WINE | 80 | SP-3 | 8 | FEMALE | 61 | FRANCE | 30 |
| | RED | 80 | SP-2 | 2 | IN TWENTIES | 35 | JAZZ | 1 |
| | . | | . | | . | | . | |
| | . | | . | | . | | . | |
| | . | | . | | . | | . | |

MERCHANDISE M2

| MERCHANDISE ID | USUAL REGISTRATION TAG | MUTUAL REGISTRATION TAG | | | |
|---|---|---|---|---|---|
| | . | . | . | . | . |
| | . | . | . | . | . |
| | . | . | . | . | . |

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2014/066557, filed on Jun. 23, 2014, the contents of all of which are incorporated herein by reference in their entirety.

TECHNICAL FIELD

The present invention relates to an information processing device, an information processing method, a program, and a storage medium. Especially, the present invention relates to management and use of tag information of a user, a shop and merchandise in an electronic commerce system.

CITATION LIST

Patent Literature

Patent Literature 1: JP2013-534340 A

BACKGROUND ART

With an electronic commerce system using a network such as the Internet, presentation of merchandise and presentation of a search result desirable for respective users are effective, for the purpose of promoting commercial transaction. In view of this, presentations such as the following have been practiced: recommended merchandise is presented to a user logged in to a commercial website, merchandise related to another piece of merchandise purchased in the past is presented, and the like.

Similarly, Patent Literature 1 discloses presentation of recommend information, in which behavior of a user, particularly a click, a page view, and a similar operation, is used as a basis.

SUMMARY OF INVENTION

Technical Problem

As an electric commerce system allows a user to browse an enormous volume of merchandise and shops, more occasions for the user to purchase desired merchandise are provided, and further, selection of shops and comparison among merchandise has become easy. Meanwhile, with exceeding amount of options for a user, a situation arises where the user has a trouble finding merchandise or a shop that suits most to the demand of the user.

In view of the above situation, an object of the present invention is to ensure efficient presentation of merchandise and a shop matching the demand and preference of a user on an electronic commerce system.

Solution to Problem

First, an information processing device according to the present invention includes a tag management unit, a tag processing unit, and a presentation information generating unit. The tag management unit executes a tag mutual assignment process on a tag database that stores tag information corresponding to respective user identification information of an individual user, shop identification information of an individual shop operating in an electronic commerce system, and merchandise identification information of an individual piece of merchandise provided for the electronic commerce system, in response to a mutual assignment target action from a user terminal. The tag mutual assignment process realizes a state where tag information is mutually assigned between user identification information and either shop identification information or merchandise identification information, and each of the identification information is related to the mutual assignment target action. The tag processing unit searches tag information corresponding to the user identification information, the shop identification information or the merchandise identification information based on the tag database, each of the identification information being related to a tag process target action in response to the tag process target action from the user terminal. The tag processing unit acquires tag information or identification information that is used for generating presentation information to be transmitted to the user terminal based on extracted tag information. The presentation information generating unit generates presentation information to be transmitted to the user terminal using the tag information or identification information acquired by the tag processing unit.

In the tag database, tag information is associated to user identification information, shop identification information, and merchandise identification information. The tag information corresponding to respective pieces of identification information is mutually assigned in response to a mutual assignment target action. For example, in a case where a certain mutual assignment target action relates to certain user identification information and certain shop identification information, the tag information corresponding to the user identification information is assigned so as to corresponding to the shop identification information as well. Additionally, the tag information corresponding to the shop identification information is also made corresponding to the user identification information. Thus, in response to a mutual assignment target action from a user terminal, tag information is mutually assigned between related identification information.

According to this operation, among the tag information associated to the user identification information, the tag information reflecting individual preference and demand, attribute, or similar information of a user becomes dominant. Meanwhile, among the tag information associated to shop identification information a merchandise identification information, the tags reflecting preference and demand by major users favoring a shop and merchandise, a concept, or similar information become dominant.

With such tag database, presentation of a shop or merchandise that matches tendencies of individual preference of a user, major preference and demand toward a shop or merchandise, and for example, a concept of a shop or merchandise can be realized, by searching tag information and identification information, according to a predetermined tag process target action by a user.

As the information processing device according to the present invention, an information processing device that includes the above tag management unit and an information processing device that includes the above tag processing unit and presentation information generating unit may be realized.

Second, in the above information processing device according to the present invention, the tag management unit preferably manages the effective tag information to be additionally assigned to identification information of an assignment destination in the tag mutual assignment process, the effective tag information being determined as effective by a predetermined condition among tag information corresponding to identification information of assignment source.

As mutual assignment of tags is executed in quantity, a situation where tag information not particularly related to a user is added to the user identification information. Similarly, tag information unsuitable for a shop or merchandise is added to the shop identification information or the merchandise identification information. On the other hand, tag information assigned from an assignment source to an assignment destination preferably targets tag information suitable for the assignment destination. Therefore, effective tag is configured to be selected based on a predetermined condition, and mutual assignment is configured to be executed targeting the effective tag information.

Third, in the above information processing device according to the present invention, the tag management unit preferably manages a count of assignment by the tag mutual assignment process regarding respective tag information corresponding to identification information, and the tag management unit preferably determines whether or not a plurality of pieces of respective tag information corresponding to identical identification information is effective tag information based on the account of assignment.

Tag information is enriched by a large count of mutual assignment. Identical tag information that is assigned more than once is likely to match preference of a user or a concept of merchandise and shop. Accordingly, such tag information is suitable to be treated as effective tag information.

Fourth, in the above information processing device according to the present invention, the tag management unit executes an addition process of tag information to the tag database on acquiring user information, shop information, or merchandise information.

That is, an occasion to assign tag information, other than mutual assignment, is provided. Such configuration provides, for example, an initial tag assignment occasion and an addition occasion of an additional tag information representing a user preference, a concept set of a shop and merchandise, change in sales style, and the like.

Fifth, in the above information processing device according to the present invention, the tag processing unit preferably extracts the effective tag information that is determined effective by a predetermined condition among a plurality of pieces of tag information corresponding to identical identification information from the tag database, and acquires tag information or identification information that is used for generating presentation information based on the extracted effective tag information.

Mutual assignment may assigns tag information unsuitable for a user, a shop or merchandise on the tag database. Thus, execution of a process targeting effective tag information determined as effective by a predetermined condition improves reliability of the acquiring process of tag information and identification information for generating presentation information.

Sixth, in the above information processing device according to the present invention, the tag processing unit preferably determines whether or not a plurality of pieces of respective tag information corresponding to an identical identification information is effective tag information, based on the count of assignment.

As described above, identical tag information that is assigned more than once is likely to match preference of a user or a concept of merchandise and shop. Accordingly, such tag information is suitable to be treated as effective tag information.

Seventh, in the above information processing device according to the present invention, the tag processing unit may extract tag information corresponding to user identification information related to the tag process target action from the tag database, and acquire shop identification information or merchandise identification information that has tag information common to the extracted tag information, as identification information used for generating presentation information.

In a case where login by a user to a web page or a similar operation is assumed as a tag process target action, user identification information is acquired as identification information related to the tag process target action. In this case, the tag information corresponding to the user identification information is extracted to ensure acquiring the shop identification information or the merchandise identification information having the tag information common to the extracted tag information.

Eighth, in the above information processing device according to the present invention, the tag processing unit may extract tag information common between user identification information related to the tag process target action and either shop identification information or merchandise identification related to the tag process target action from the tag database, and acquire another shop identification information or merchandise identification information that has tag information common to the extracted tag information, as identification information used for generating presentation information.

In a case where a click on a link to a shop page and merchandise page by a user or a similar operation is assumed as a tag process target action, user identification information and either shop identification information or merchandise identification information are acquired as identification information related to the tag process target action. In such case, shop identification information or merchandise identification information that has tag information common to the tag information that the user tag information and either the shop identification or the merchandise information have in common.

Ninth, in the above information processing device according to the present invention, the tag processing unit may extract tag information corresponding to user identification information related to the tag process target action from the tag database, and the tag processing unit may set the extracted tag information as tag information used to generate presented information.

For example, in a case where input of the search character, the search execution, or a similar operation by a user is assumed as an tag process target action, as the identification information related to the tag process target action, the user identification information is acquired. In such case, the tag information corresponding to the user identification information can be acquired and can be used for the character string input and the search.

Tenth, in the above information processing device according to the present invention, the tag processing unit may extract tag information from the tag database based on shop identification information or merchandise identification information related to the tag process target action, and the tag processing unit may set the extracted tag information as tag information used to generate presented information.

For example, in a case where search execution or a similar operation by a user is assumed as a tag process target action, the tag information is acquired from the identification information for searched merchandise and shop. Thus, tag information is reflected to a search operation or the like.

An information processing method according to the present invention manage a tag database that stores tag information corresponding to respective user identification information of an individual user, shop identification information of an individual shop operating in an electronic commerce system, and merchandise identification information of an individual piece of merchandise provided for the electronic commerce system. The information processing method includes a step of detecting a mutual assignment target action from a user terminal, and a step of executing a mutual assignment process realizing a state where tag information is mutually assigned between user identification information and either shop identification information or merchandise identification information, each of the identification information being related to the mutual assignment target action in response to a mutual assignment target action.

Accordingly, a database such that tag information is accumulated by mutual assignment in response to a mutual assignment target action.

Further, the information processing method according to the present invention executes a tag mutual assignment process on a tag database, and the information processing method includes a tag processing step of searching tag information corresponding to the user identification information, the shop identification information or the merchandise identification information based on the tag database, each of the identification information being related to a tag process target action in response to the tag process target action from the user terminal, and acquiring tag information or identification information that is used for generating presentation information to be transmitted to the user terminal based on extracted tag information, and a presentation information generating step of generating presentation information to be transmitted to the user terminal using the tag information or identification information acquired by the tag processing unit.

With such method, presentation of a shop or merchandise that matches tendencies of individual preference of a user, major preference and demand toward a shop or merchandise, and for example, a concept of a shop or merchandise can be realized.

A program according to the present invention is a program that causes an information processing device to execute a process as the above respective information processing methods.

A storage medium according to the present invention is a storage medium that stores the above-described respective programs. Such program and storage medium achieve the above information processing device.

Advantageous Effects of Invention

According to the present invention, tag information on a user, a shop and merchandise is collected to a tag database in response to a mutual assignment target action by a user. By matching of the tag information or a similar operation, the merchandise and the shop to which the user's various demands have been reflected can be efficiently presented. Therefore the usability of an electronic commerce system can be improved.

BRIEF DESCRIPTION OF THE DRAWINGS

FIG. 4 are explanatory views of user tag databases according to the embodiment;

FIG. 5 are explanatory views of shop tag databases and merchandise tag databases according to the embodiments;

DESCRIPTION OF EMBODIMENTS

The following describes embodiments in the order listed below.
<1. Overall Configuration>
<2. Functional Configuration of Electronic Commerce Server and Tag Database>
<3. Tag Registration Process>
<4. Tag Mutual Assignment Process>
<5. Tag Use Process Example>
<6. Summary and Modifications>
<7. Program and Storage Medium>

As an example of an information processing device referred to in the claims of the present invention, the embodiments describe an electronic commerce server (an EC server) that provides an electronic commerce system. The electronic commerce server is achieved with one or a plurality of information processing devices. Therefore, the information processing device referred in the claims of the present invention is achieved with one information processing device or a plurality of cooperated information processing devices.

The main terms used in the embodiment have the following meanings.

User: a user who uses the electronic commerce system to browse and purchase merchandise, or perform a similar operation.

Merchandise: merchandise targeted in a commercial transaction on the electronic commerce system. The merchandise includes merchandise as various services, as well as merchandise as physical articles.

Shop: a shop operated on the electronic commerce system.

Mutual assignment target action: a user action triggering execution of tag mutual assignment.

Tag process target action: a user action triggering some sort of presentation control using a tag A user action is a generic name for behaviors executed by a user using a user terminal. For example, the user action includes a click operation on a link image, a search word input, a search execution operation, a favorite registration operation, a purchase operation, and a login operation.

1. Overall Configuration

Figure 1:
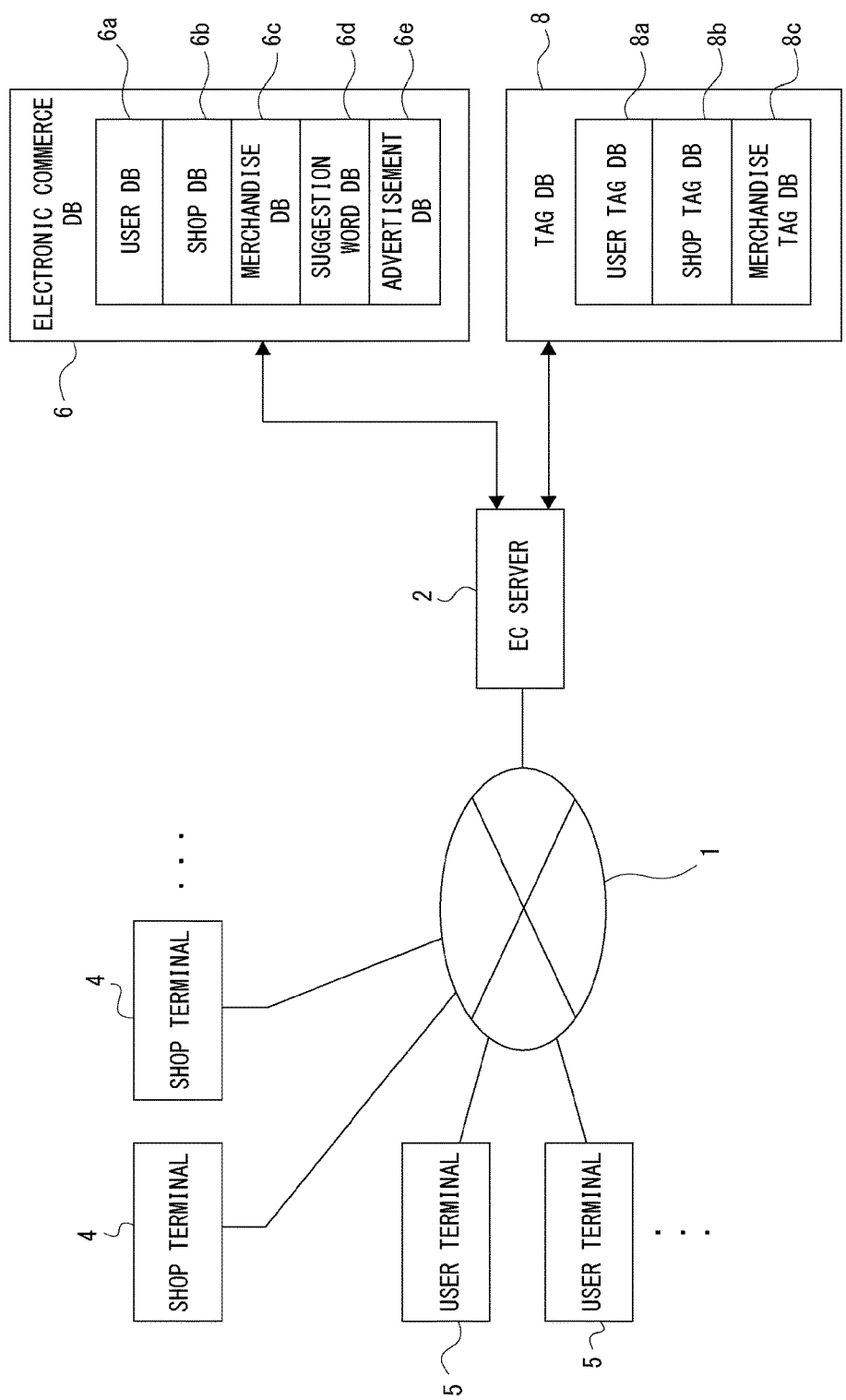
FIG. 1 is a block diagram of an outline of an electronic commerce system according to embodiments of the present invention.

FIG. 1 illustrates an example of a configuration of a network system that functions as an EC (Electronic Commerce) system. The electronic commerce system achieves a virtual shopping center where a plurality of shops are operated. An electronic commerce server (hereinafter referred to as an "EC server") 2 in FIG. 1 corresponds to an embodiment of an information processing device of the claims of the present invention.

As illustrated in FIG. 1, in an EC system according to the embodiments, the EC server 2, a plurality of shop terminals 4, a plurality of user terminals 5 are mutually communicably connected to each other via a network 1. Further, the configuration allows the EC server 2 to access an electronic commerce database 6 and a tag database 8.

Hereinafter, a "database" is referred to as "DB".

Various examples may be assumed as a configuration of the network 1. For example, the Internet, an intranet, an extranet, a LAN (Local Area Network), a CATV (Community Antenna TeleVision) communications network, a Virtual Private Network, a telephone network, a mobile communications network, a satellite communications network, and a similar network may be assumed.

Various examples may also be assumed as transmission medium configuring whole or a part of the network 1. For example, a wire system, such as the IEEE (Institute of Electrical and Electronics Engineers) 1394, a USB (Universal Serial Bus), a power-line carrier, and a telephone line, an infrared radiation, such as an IrDA (Infrared Data Association), and also a wireless system, such as the Bluetooth (registered trademark), the 802.11 wireless, a mobile phone network, a satellite channel, and a digital terrestrial network are applicable.

The EC server 2 is, for example, a virtual shopping center server functioning as a portal for a virtual shopping center. The EC server 2 executes a process based on a process request received from the shop terminal 4 and the user terminal 5. For example, the EC server 2 provides a search page for merchandise and a service to a user, provides a shop page to each shop, searches the merchandise and the service according to a search by a user, displays a list of search results, displays advertisements, recommended merchandise, and the like to a user, executes processing regarding a merchandise purchase, manages shops, manages users, and perform a similar process.

The shop terminal 4 represents an information processing device used by the side of an operating shop side on the virtual shopping center. The shop terminal 4 is used for registering information on merchandise sold on the virtual shopping center or similar information with the electronic commerce DB 6 via the EC server 2, or for a similar process. For example, a display section of the shop terminal 4 displays a dedicated screen provided by the EC server 2. A person in charge in a shop registers information on the merchandise or similar information with the electronic commerce DB 6 through this dedicated screen.

The user terminal 5 represents an information processing device operated by a user who purchases merchandise and a service via the virtual shopping center. The user terminal 5 is realized with an information processing device, such as a personal computer, a mobile phone, or a portable information terminal.

In case of the present embodiments, for example, the EC server 2 starts a HTTP (Hypertext Transfer Protocol) daemon. The shop terminal 4 or the user terminal 5 starts a browser. The shop terminal 4 or the user terminal 5 transmits a process request (an HTTP request) to the EC server 2 via the browser. The EC server 2 transmits a process result (an HTTP response) corresponding to the above process request to the shop terminal 4 or the user terminal 5. For example, page data described in web page description language is transmitted to the shop terminal 4 or the user terminal 5. Based on this page data, the display section of the shop terminal 4 or the user terminal 5 displays the web page (the screen) based on a process result.

By such operation, the EC server 2 provides a web page as the virtual shopping center for the user terminal 5. The EC server 2 further executes a merchandise search, merchandise presentation, advertisement presentation, a settlement process, or a similar process according to the request from the user terminal 5. By similar operation, the EC server 2 provides a merchandise registration page, registers merchandise according to the request from the shop terminal 4, or execute a similar process to the shop terminal 4.

To execute these processes by the EC server 2, the electronic commerce DB 6 stores necessary information. In the figure, a user DB 6a, a shop DB 6b, a merchandise DB 6c, a suggestion word DB 6d, and an advertisement DB 6d are exemplified as DBs concerning processes described later in the present embodiments. Additionally, as well as these DBs, various DBs, which are required for the EC server 2 to function as portal for the virtual shopping center, are present.

The user DB 6a registers data regarding a user who uses the virtual shopping center. For example, the user DB 6a registers a user identification (ID), which is user identification information, a login password, attribute information such as an address, a name, a gender, and an age, settlement information, an e-mail address, or similar information for each registered user. As a purchase history of each user, the user DB 6a registers data on the history of transactions executed on the virtual shopping center. For example, the user DB 6a registers a merchandise ID of purchased merchandise, information on the merchandise, a shop where the merchandise has been purchased, the time of purchase, a purchase price, or similar information for each user ID. Further, the user DB 6a also stores a browsing history of each user, favorite registration information, or similar information.

The shop DB 6b registers data regarding the operating shops on the virtual shopping center. For example, the shop DB 6b registers, a shop ID as shop identification information, a name, an address, and a telephone number, link information (URL (Uniform Resource Locator) to a web page (a shop page)) regarding the shop, or similar information for each shop.

The merchandise DB 6c registers data regarding the merchandise dealt in the virtual shopping center. For example, the merchandise table 6b registers, for each piece of merchandise, a merchandise ID as merchandise identification information, a shop ID of the shop that sells the piece of merchandise, a category, a name, a price, and a stock of the piece of merchandise, link information (URL) to the web page (the merchandise page) regarding the piece of merchandise, or similar information.

The suggestion word DB 6*d* stores suggestion words, which are presented to assist input when a user inputs a search character on the search page. To the suggestion word DB, phonetic information, priority information, a search count, or similar information is linked to the respective suggestion words. A suggestion process executed by the EC server 2 is as follows: when receiving a search character string inputted to the user terminal 5, the EC server 2 extracts a suggestion word, to which a highly-relevant search word has been added, from the suggestion word DB 6*d* and presents the suggestion word on the user terminal 5. For example, at a point when the user inputs "WI (wai)" as the search string, the EC server 2 extracts candidates such as "wine", "wineglass", "wine France", and "winding" . . . whose phonetic representation matches "WI (wai)" by forward match, sorts the candidates by the priority information, and presents the candidates on the user terminal. In this manner, the suggestion process assists input of a user.

An advertisement DB 6*e* registers advertisement information registered by a shop. Photographs of merchandise and a shop, advertising images such as a logo, text information as an advertising copy, a keyword to select the advertisements, a URL link, achievement information, advertising unit price information, and similar information are associated to each piece of the advertisement information. The achievement information includes a display count (an impression), a click count, a CTR (Click Through Rate), a count of accesses, a count of conversions, a CVR (Conversion Rate), a merchandise sales value, and similar information.

The EC server 2 is configured to display an advertising image and a text selected from the advertisement DB 6*e* on various web pages.

Further, the configuration allows the EC server 2 to access to the tag DB 8.

The tag DB 8 includes a user tag DB 8*a*, a shop tag DB 8*b*, and a merchandise tag DB 8*c*.

The user tag DB 8*a* stores tag information corresponding to a user ID of an individual user.

The shop tag DB 8*b* stores tag information corresponding to a shop ID of an individual shop.

The merchandise tag DB 8*c* stores tag information corresponding to a merchandise ID of an individual piece of merchandise (including a service). The details of these DBs will be described later.

For the convenience of explanation, the "tag DB 8" is used as a generic name for the user tag DB 8*a*, the shop tag DB 8*b*, and the merchandise tag DB 8*c*.

In the present embodiments, the EC server 2 accesses such electronic commerce DB 6 and tag DB 8, and acquire information required for various processes.

The electronic commerce DB 6 and the tag DB 8 may be constructed in a server computer different from the EC server 2 or may be constructed in the EC server 2. Although described as the electronic commerce DB 6 and the tag DB 8 for the convenience of illustration and description, the respective DBs of the user DB 6*a*, the shop DB 6*b*, the merchandise DB 6*c*, the suggestion word DB 6*d*, the advertisement DB 6*d*, the user tag DB 8*a*, the shop tag DB 8*b*, and the merchandise tag DB 8*c* may be achieved in any form as long as the EC server 2 can access the respective DBs. For example, all the respective DBs may be formed in a storage unit in a system identical to the EC server 2. Alternatively, a part or whole of the respective DBs may be configured as a separate module, as a computer system remote from the EC server 2, or the like. Further, the respective DBs need not be formed in one device (for example, one HDD). Similarly, the DBs need not be each configured as one DB. For example, a plurality of user DBs (for example, the user DB for login and the user DB for transaction) may also store and manage the information stored as the user DB 6*a*. Each of the respective DBs described in the embodiments merely exemplify a storage unit for information related to the processes of the embodiments in the form of one DB.

Figure 2:
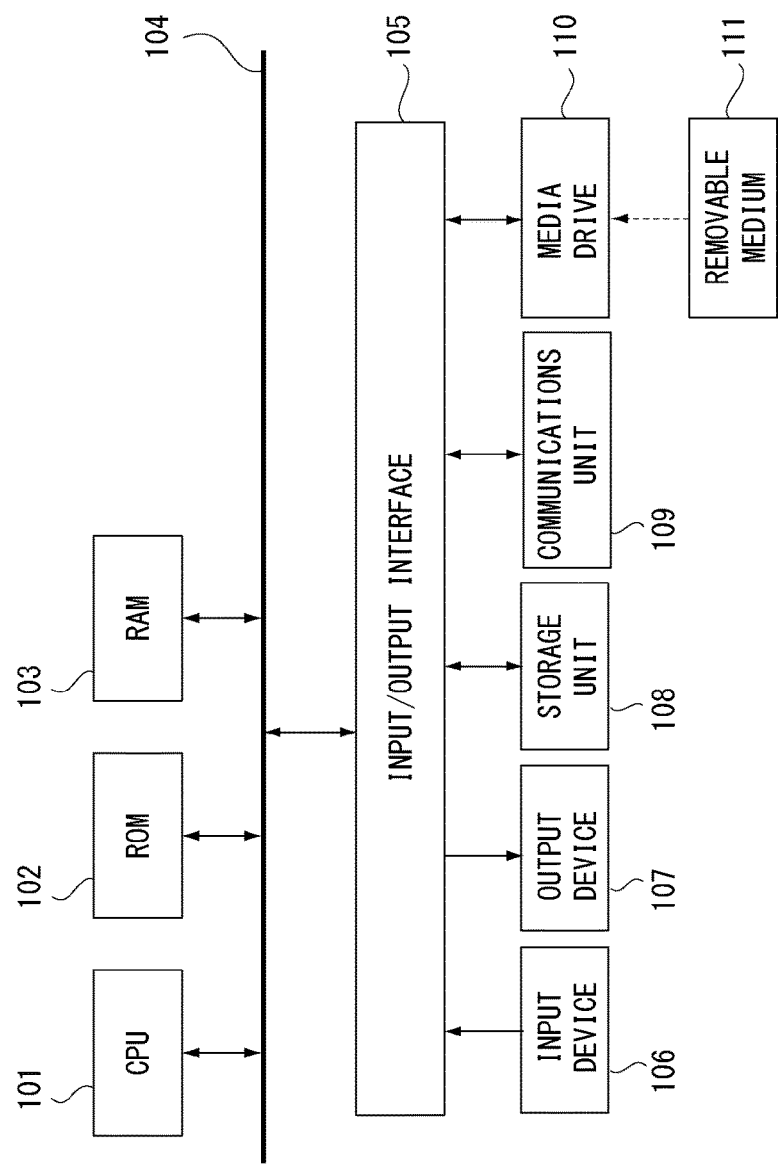
FIG. 2 is a block diagram of a computer device used in the embodiments.

Subsequently, FIG. 2 illustrates a hardware configuration of the information processing device constituting the EC server 2, the shop terminal 4, and the user terminal 5, which are illustrated in FIG. 1. The respective devices described as the EC server 2, the shop terminal 4, and the user terminal 5 can be achieved as a computer device as illustrated in FIG. 2. Such computer devices can execute information processing and information communications.

In FIG. 2, a CPU (Central Processing Unit) 101 of the computer device executes various processes according to a program stored in a ROM (Read Only Memory) 102 or a program loaded from a storage unit 108 to a RAM (Random Access Memory) 103. Further, the RAM 103 stores data required for the CPU 101 to execute various processes or similar data, as appropriate.

The CPU 101, the ROM 102, and the RAM 103 are connected to each other via a bus 104. An input/output interface 105 is also connected to this bus 104.

To the input/output interface 105, an input unit 106, an output unit 107, the storage unit 108, and a communications unit 109 are connected. The input unit 106 includes a keyboard, a computer mouse, a touchscreen, or a similar unit. The output unit 107 includes a display such as a LCD (Liquid Crystal Display), a CRT (Cathode Ray Tube), an organic EL (Electroluminescence) panel, or a similar unit; and a speaker or a similar unit. The storage unit 108 includes a Hard Disk Drive (HDD), a flash memory device, or a similar device. The communications unit 109 executes a communications process and communications between devices over the network 1.

Additionally, a media drive 110 is connected to the input/output interface 105 as necessary. A removable medium 111, such as a magnetic disk, an optical disk, a magneto-optical disk, or a semiconductor memory, is mounted as appropriate. Thus, information is written to and read from the removable medium 111.

Such computer device uploads and downloads data and a program through communications by the communications unit 109 and can exchange data and a program via the removable medium 111.

Process operations based on various programs by the CPU 101 executes the information processes and communications required as the EC server 2, the shop terminal 4, and the user terminal 5.

The information processing device configuring the EC server 2, the shop terminal 4, and the user terminal 5 is not limited to the configuration of the single computer device as illustrated in FIG. 2. The information processing device may be configured of a plurality of systemized computer devices. The plurality of computer devices may be systemized with a LAN or a similar network or may be remotely disposed with VPN or a similar network using the Internet or a similar medium.

2. Functional Configuration of Electronic Commerce Server and Tag Database

Figure 3:
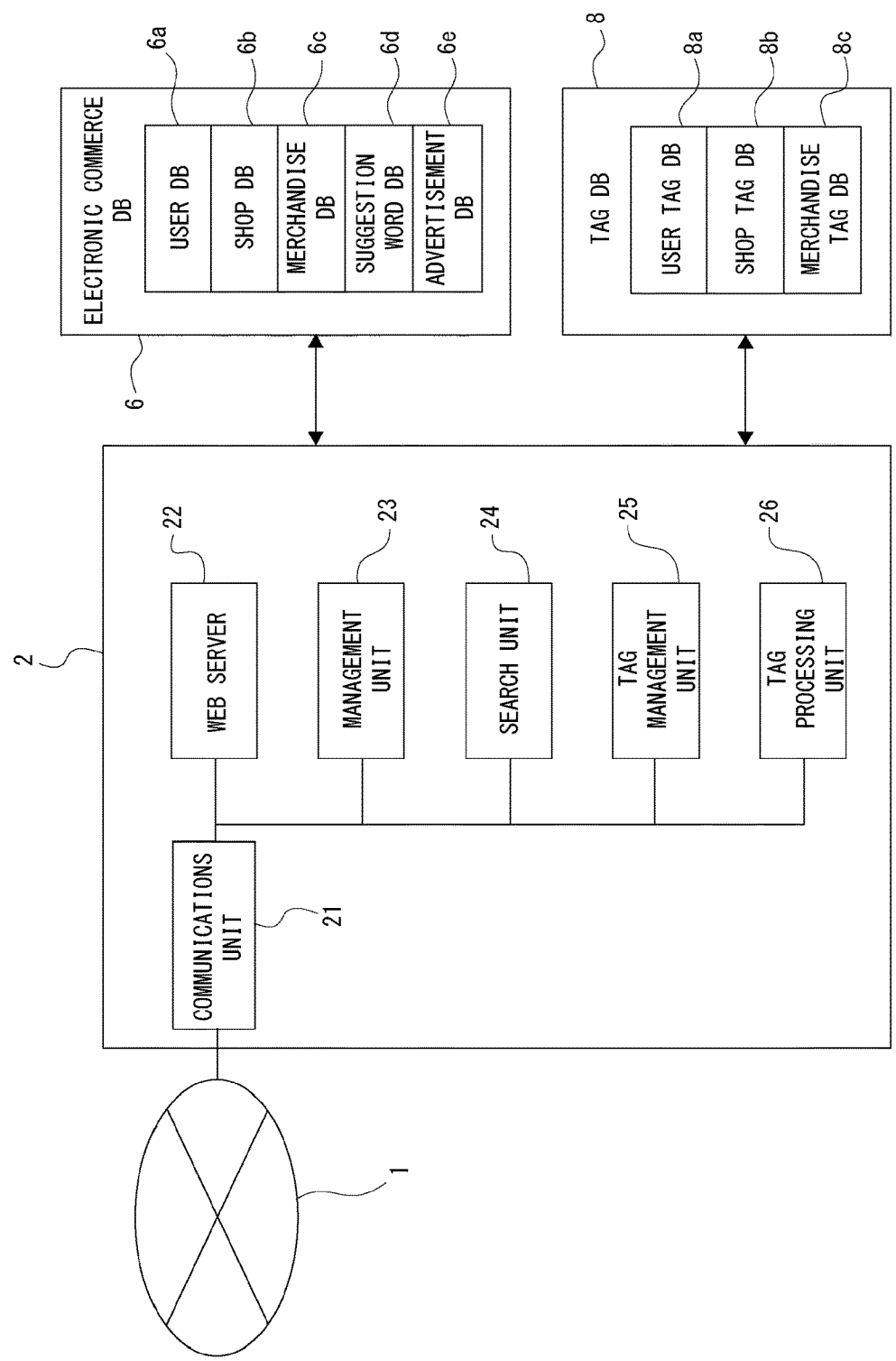
FIG. 3 is an explanatory view of a functional configuration of an electronic commerce server and database according to the embodiments.

FIG. 3 illustrates a functional configuration as the EC server 2 constituted by one or a plurality of information processing devices.

The respective functions as the EC server 2 are achieved by processes executed according to a program by the CPU 101 in the information processing device. However the whole or a part of processes of the respective configurations, which will be described later, may be achieved by hardware.

To achieve the respective functions with software, the respective functions need not to be achieved by an independent program. One program may execute processes of a plurality of functions, or one function may be achieved by cooperation of a plurality of program modules.

The EC server 2 includes a communications unit 21, a web server 22, a management unit 23, a search unit 24, a tag management unit 25, and a tag processing unit 26.

The communications unit 21 executes various communications with the user terminal 5, the shop terminal 4, or other information processing devices via the network 1. For example, the communications unit 21 transmits HTML data constituting the web pages, which are presented on the browser of the user terminal 5 and the shop terminal 4, receives input information executed on a web screen of the user terminal 5 and the shop terminal 4, and executes a similar process.

The web server 22 generates various web pages (generate HTML data) constituting the virtual shopping center. For example, the web server 22 generates various page data, such as a portal screen, a search screen, a search result screen, a merchandise screen, and a shop screen. For this process, the web server 22 also acquires required information from the user DB 6a, the shop DB 6b, the merchandise DB 6c, the suggestion word DB 6d, and the advertisement DB 6d.

The management unit 23 executes processes necessary in the electronic commerce system, such as user registration, shop registration, merchandise registration, a login process by the user terminal 5 and the shop terminal 4, advertisement registration, and a settlement process. In association with these processes, the management unit 23 also manages registration and update of the information in the user DB 6a, the shop DB 6b, the merchandise DB 6c, the suggestion word DB 6d, the advertisement DB 6d, and the like.

The search unit 24 executes a merchandise search using the merchandise DB 6c, a shop search using the shop tag DB 8b, an advertising search using the advertisement DB 6e, or a similar search, and acquire information on merchandise, a shop, an advertisement, or similar information to be presented on a web page. Such information is, for example, sent to the web server 22 and is used to generate a web page.

The tag management unit 25 executes registration-management processes on the tag information (hereinafter simply referred to as a "tag") with the tag DB 8 (the user tag DB 8a, the shop tag DB 8b, and the merchandise tag DB 8c).

In the present embodiment, the management unit 23 executes mainly two registration-management processes. One process is a tag registration process (hereinafter referred to as a "usual registration process") that executes an addition process of a tag to the tag DB 8 in response to acquisition of user information, shop information, or merchandise information by the EC server 2 on a given occasion.

Another process is a tag mutual assignment process that, in response to detection of a mutual assignment action in the user terminal 5 by the EC server 2, realize a state where mutual assignment has been performed regarding the mutual assignment action, either between a user ID and a shop ID, or between a user ID and a merchandise ID.

Both FIGS. 4 and 5 describe the user tag DB 8a.

FIG. 4 illustrates an example of information content in the user tag DB 8a. As an example, FIG. 4 illustrates tags registered with certain users U1 and U2.

In the user tag DB 8a, a plurality of tags can be registered corresponding to the user ID for respective users. A tag that is registered in the user tag DB 8a is hereinafter referred to as a "user tag."

The user tag DB 8a stores respective user tags together with a numerical value as a tag point.

The figures illustrate an example where various user tags, such as "male", "business shoes", and "SP-A", and tag points are managed as usual registration tags or as mutual assignment tags.

A user tag registered in the above usual registration process is managed as a usual registration tag. For example, in the initial registration for the use of the electronic commerce system by a user, information, such as a name, an address, a gender, an age, and nationality of the user, is linked to a newly issued user ID, thus the information is registered with the user DB 6a. In such case, a part of the information registered in the user DB 6a, for example, the gender, the age bracket, and the nationality can be registered as the user tags in the user tag DB 8a.

A tag added by the mutual assignment process is managed as a mutual assignment tag. For example, a tag linked to a destination shop ID or a destination merchandise ID targeted in the mutual assignment process is added as a user ID.

In the following description, a usual registration tag and a mutual assignment tag are thus distinguished; however, the tags may not be managed with such distinction.

In FIG. 4 (and FIG. 5 which is described later), a numerical value accompanies a word as a respective tag. Such numerical value is a tag point managed for each tag. A tag point stored for each tag is a value, for example, representing an assignment count.

By the tag mutual assignment process, an identical tag may be given to one user ID for more than one time. To handle such case, an assignment count is configured stored as a tag point. For example, in the case of the user U1 in FIG. 4, tag points are stored in the following manner: "18" is stored corresponding to the user tag, "male" and "3" to the user tag "business shoes, and the like. Although a usual registration tag is not registered by the mutual assignment at first, an identical tag may be added by the mutual assignment process afterward. Thus, a tag point (the assignment count) is also stored for a usual registration tag.

Furthermore, a tag point is not limited to an assignment count.

FIG. 5 illustrates examples of information content in the shop tag DB 8b and the merchandise tag DB 8c. In the figure, tags registered with certain shops S1 and S2 and tags registered with certain merchandise M1 and M2 are illustrated.

In the shop tag DB 8b, a plurality of tags can be registered corresponding to the shop ID of respective shops. A tag registered in the shop tag DB 8b is referred to as a "shop tag."

In the merchandise tag DB 8c, a plurality of tags can be registered corresponding to the merchandise ID of respective merchandise. A tag registered in the merchandise tag DB 8c is referred to as a "merchandise tag."

As is the case of the user tag DB 8a, the shop tag DB 8b and the merchandise tag DB 8c store each shop tag or merchandise tag together with a numerical value as a tag point. Further, a usual registration tag and a mutual assignment tag are distinguishably managed.

As the tags in FIG. 4 and FIG. 5, "SP-A", "SP-B", or a similar expression represents a shop name. "BRP-A", "BR-B", or a similar expression represents a brand name of the merchandise.

The tag management unit 25 in FIG. 3 is configured to execute the usual registration process, which adds a usual registration tag, and to execute the mutual assignment process of a tag between identification information, on the above-described user tag DB 8a, shop tag DB 8b, and merchandise tag DB 8c.

In response to a tag process target action in the user terminal 5, the tag processing unit 26 searches the tag DB 8 for a tag corresponding to the user ID, the shop ID, or the merchandise ID related to the tag process target action. Based on an extracted tag, the tag processing unit 26 executes a process to acquire a tag or an ID, which is to be used for generating presentation information transmitted to the user terminal 5.

As will be described in detail later, using a tag or an ID extracted by the tag processing unit 26, the search unit 24 searches the electronic commerce DB 6 to acquire information and executes a process to cause the web server 22 to generate page data using the information, or execute a similar process.

The above-described functional configuration in FIG. 3 is an example where the tag management unit 25 corresponds to the tag management unit referred in the claims, the tag processing unit 26 corresponds to the tag processing unit referred in the claims, and the web server 22 and the search unit 24 correspond to the presentation information generating unit referred in the claims.

3. Tag Registration Process

As described above, the tag DB 8 stores a user tag for each user ID of respective users, stores a shop tag for each shop ID of respective shops, and stores a merchandise tag for each merchandise ID of respective merchandise. The following describes the usual registration process for such tag DB 8, by the process executed mainly by the tag management unit 25.

Figure 6:
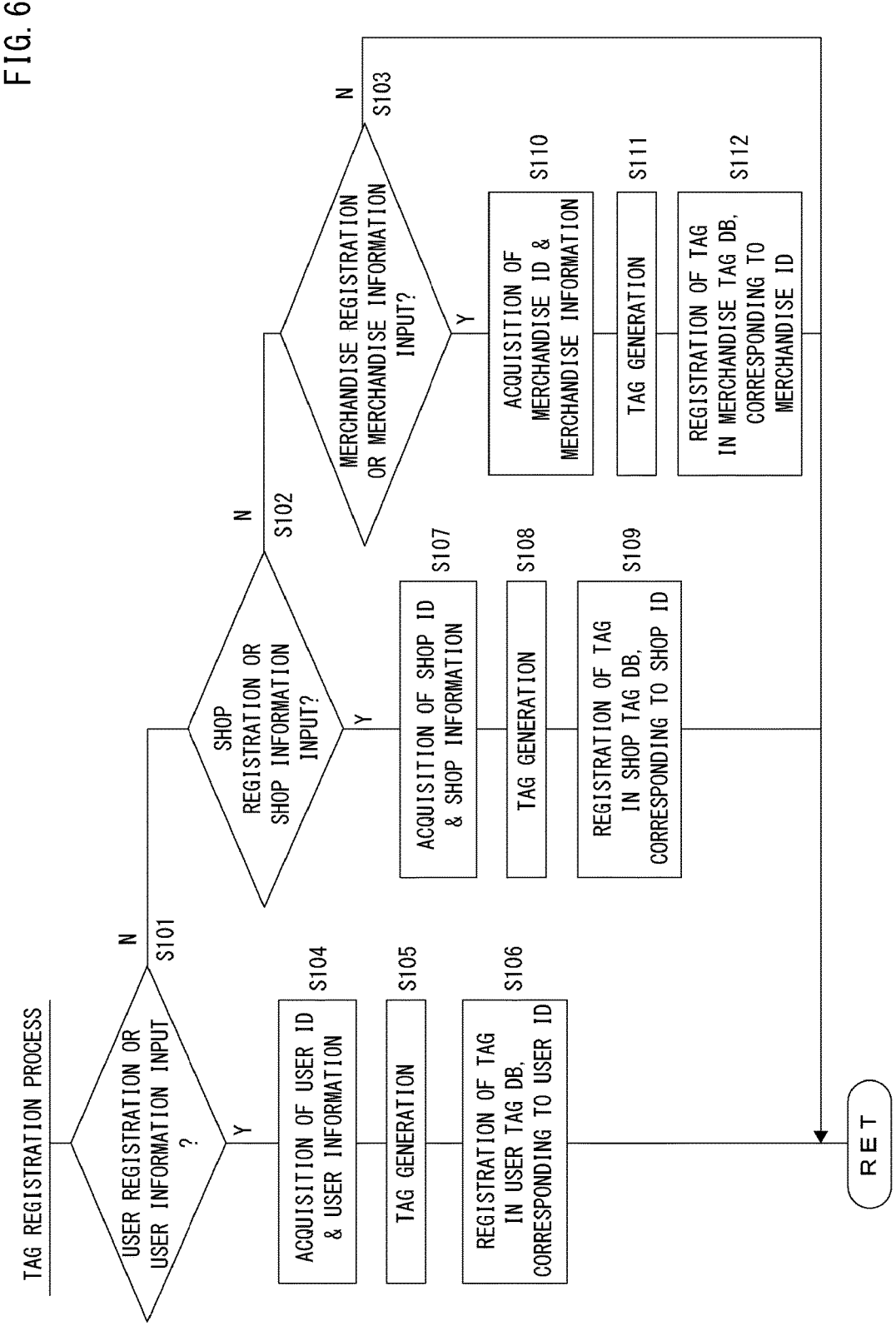
FIG. 6 is a flowchart of a tag registration process according to the embodiments.

FIG. 6 illustrates an example of the tag registration process as the usual registration process executed by the EC server 2. The EC server 2 executes the processes in FIG. 6 mainly by the functions of the tag management unit 25.

The tag management unit 25 monitors execution timing of the tag registration at Steps S101, S102, and S103.

At Step S101, the tag management unit 25 monitors user registration or user information input as timing of user tag registration.

For example, when a general user uses the electronic commerce system, user registration is recommended. The EC server 2 issues a user ID to a user who executes user registration and registers the attribute information of the user in the user DB 6a. In such occasion, the tag management unit 25, for example, can acquire a user tag associated to the user ID as a part of the attribute information of the user.

The information to be used as a user tag can also be acquired by, for example, a predetermined action of a user. For example, when a user transmits an answer to a questionnaire, the tag management unit 25 can acquire information such as a hobby, preference, a family structure, and the like as an answer. Some of such information can be used as tags.

When the tag management unit 25 detects user registration or some occasion to acquire user information as described above, the tag management unit 25 advances the processing from Step S101 to S104, and acquires a user ID and user information. From the acquired user information, the tag management unit 25 at Step S105 generates a tag for registration. Then, at Step S106, the management unit 25 registers the generated tag in the user tag DB 8a, making the generated tag corresponding to the user ID. For example, a user tag such as a gender "male", an age bracket, "in thirties", nationality, "Japan", is registered corresponding to the user ID for a user U1 in FIG. 4. A user tag registered as such may feature a variety of contents, for example, a favorite merchandise category, a hobby, and the like.

Thus, a tag point indicating the assignment count of respective user tags at the timing of new registration is "1." In addition to the tag registration during the user registration, an identical tag may possibly be a registration target, for example, when a questionnaire is answered afterward. In this case, the assignment count of an identical tag may be increased. However, the usual registration process may be configured not to register a user tag identical to a certain user tag that has already been registered. The same applies to a shop tag and a merchandise tag, which will be described later.

At Step S102, the tag management unit 25 monitors shop registration or shop information input as timing of shop tag registration.

For example, the shop registration of a shop operating on the electronic commerce system is performed to start operation of a shop. The EC server 2 issues a shop ID to a shop to be registered and registers attribute information of the shop in the shop DB 6b. In such occasion, for example, the tag management unit 25 can acquire a shop tag associated to a shop ID as a part of the attribute information of the shop.

The information to be used as a shop tag can also be acquired by, for example, a predetermined action of a user or a shop. For example, when some communication takes place between a user and a shop via the EC server 2, the information on a shop can be acquired from the content of the communication. For example, the information on a shop can be extracted from a reply message of the shop side on the information inquired from a user to the shop via the electronic commerce system. For example, the information includes information such as availability of a credit card and whether or not shipping is free. Further, the information on a shop can also be extracted from an evaluation on the shop made by a user who has transacted with the shop and from the information on a shop review. An image of a shop information on a shop manager and a shop staff, or similar information can also be the information on the shop.

When the tag management unit 25 detects shop registration or an occasion to acquire shop information as described above, the tag management unit 25 advances the processing from Step S102 to S107 and acquires a shop ID and shop information. From the acquired shop information, the tag management unit 25 at Step S108 generates a tag for registration. Then, at Step S109, the management unit 25 registers the generated tag in the shop tag DB 8b, making the generated tag correspond to the shop ID. For example, with the shop S1 in FIG. 5, shop tags such as a shop name, "SP-A", a piece of merchandise in deal, "bag", and a location "Tokyo" are registered corresponding to the shop ID. A shop tag registered as such may feature a variety of contents such as a brand name of the merchandise in deal and a concept of the shop. The content may be information acquired by image analysis of the image of a shop information on a shop manager and a shop member, or similar information. The information acquired from the image of a shop is, for example, a concept such as an ethnic or Japanese impression of a shop, and a concept color of the shop.

At Step S103, the tag management unit 25 monitors merchandise registration or merchandise information input as timing of merchandise tag registration.

The respective shops provide a new piece of merchandise for sale as necessary. The EC server 2 issues a merchandise ID for the provided piece of merchandise, and registers attribute information of the piece of merchandise in the merchandise DB 6*c*. In such occasion, the tag management unit 25 can acquire, for example, merchandise tags associated to the merchandise IDs as a part of the attribute information of the piece of merchandise.

The information to be used as a merchandise tag can also be acquired by, for example, a predetermined action of a user or a shop. For example, when some communication has taken place between a user and a shop via the EC server 2, the information on a piece of merchandise can be acquired from the communication content. Further, the information on a piece of merchandise can also be extracted from the information on a merchandise review to a piece of merchandise by a user or similar information. A merchandise image of the provided piece of merchandise in itself can be a source of the merchandise information. Analysis on a merchandise image can extract an image and a color of a piece of merchandise, so that such image and color may be used as merchandise information.

When the tag management unit 25 detects merchandise registration and an occasion of to acquire merchandise information as described above, the tag management unit 25 advances the processing from Step S103 to S110, and acquires a merchandise ID and merchandise information. From the acquired merchandise information, the tag management unit 25 at Step S111 generates a tag for registration. Then, at Step S111, the management unit 25 registers the generated tag in the merchandise DB 8*c*, making the generated tag corresponding to the merchandise ID. For example, regarding a merchandise M1 in the FIG. 5, merchandise tags related to the piece of merchandise, such as "wine" and "red", are registered corresponding to the merchandise ID of the piece of merchandise. A merchandise tag registered as such may feature a variety of contents, such as a brand name of merchandise, an area of manufacture, a manufacturer, a merchandise category, performance, application, and information acquired from a merchandise image. Information acquired from the merchandise image is, for example, a color of a piece of merchandise and an image of a model photographed with the piece of merchandise (for example, male/female, long hair/short hair, and for children/for adult/for old person).

As described above, the tag management unit 25, for example, can register a user tag, a shop tag, and a merchandise tag as required at registration (the user registration, the shop registration, and provision of merchandise) and at subsequent information input occasion. For example, the above process is executed to assign an initial tag, to assign the tag according to a change in user's preference, concept settings of a shop and merchandise, a renewal in sales style, or a similar change, or to perform a similar process.

In addition to the above usual registration process, the tag management unit 25 executes the tag mutual assignment process described below.

4. Tag Mutual Assignment Process

The tag mutual assignment process is a process, in response to a mutual assignment target action from the user terminal 5, to update the user tag DB 8*a*, the shop tag DB 8*b*, and the merchandise tag DB 8*c* such that the user tag DB 8*a*, the shop tag DB 8*b*, and the merchandise tag DB 8 are set to a state where mutual assignment of a tag is executed between a user ID and a shop ID related to mutual assignment target action or between a user ID and a merchandise ID related to the mutual assignment target action.

First, a mutual assignment target action that triggers the mutual assignment process is preferably an action such that the attention to a shop or merchandise by a user with a user ID assigned is estimated from the action. Conceivable examples are: Click on the link to merchandise or a shop (browsing action of the merchandise page and the shop page).

An operation by a user to browse a merchandise page and a shop page by clicking merchandise or a shop found on a search result list obtained as a result of a search with the user terminal 5, or clicking a merchandise advertisement, shop advertisement, and the like.

Merchandise Purchase, or Putting Merchandise in a Cart

An operation to execute a purchase operation of merchandise by a user, or an operation to put merchandise in a cart for purchase.

Favorite Registration

An operation to register merchandise or a shop as a favorite by a user

The above actions, for example, are associated to the user ID of a user who has executed such operation, the merchandise ID of a merchandise target for the operation, or the shop ID of a shop target for the operation. Assuming these actions as the mutual assignment target actions, the tag management unit 25 executes the mutual assignment process upon detection of a mutual assignment target action.

Figure 7:
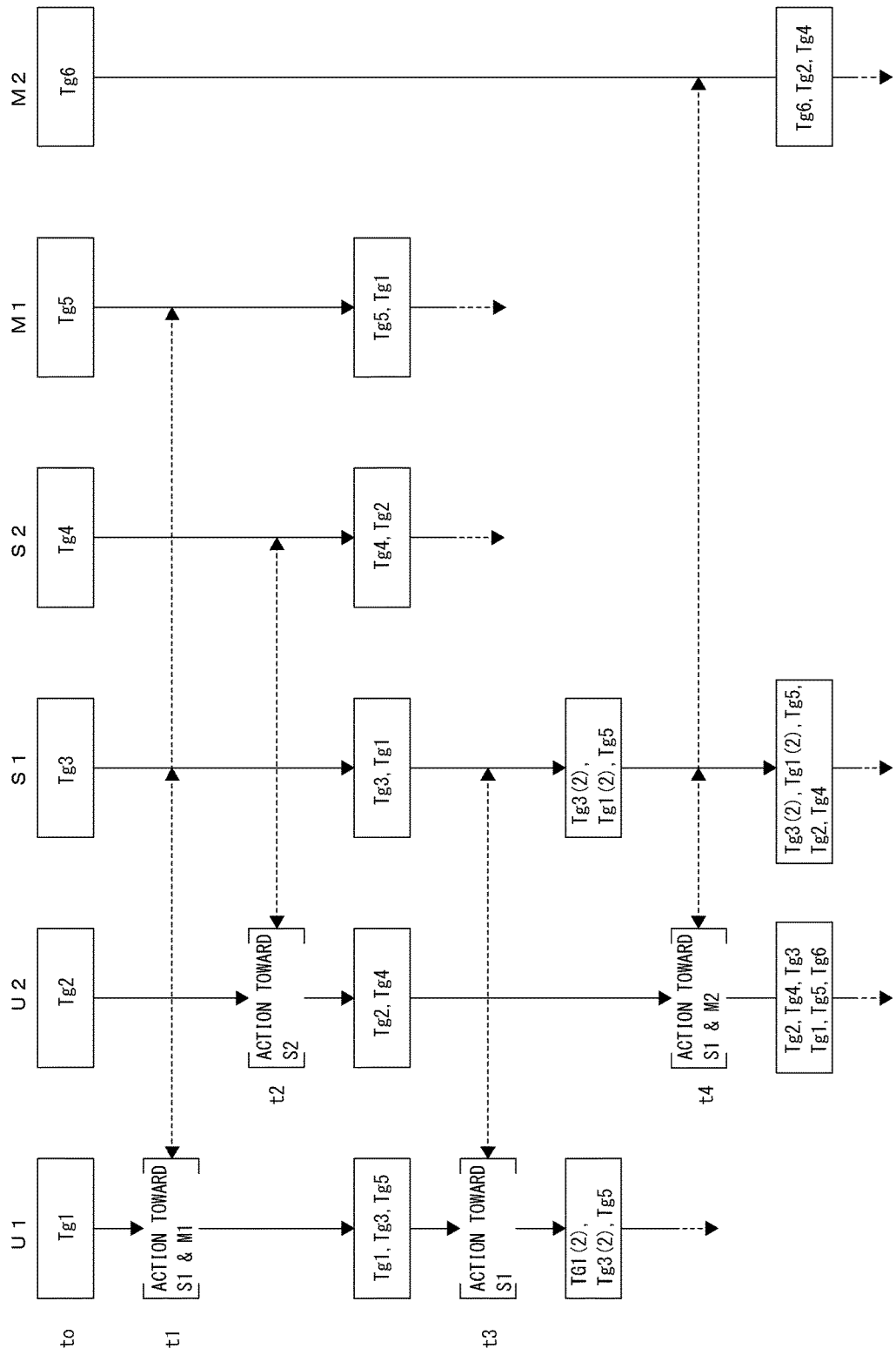
FIG. 7 is an explanatory view of tag mutual assignment according to the embodiments.

FIG. 7 schematically describes the mutual assignment.

Illustrated in the figure are the users U1 and U2, the shops S1 and S2, and the merchandise M1 and M2 as examples of the targets to which the mutual assignment is executed. Included in the boxes of the users U1 and U2 are the user tags registered in the user tag DB 8*a*. Included in the boxes of the shops S1 and S2 are the shop tags registered in the shop tag DB 8*b*. Included in the boxes of the merchandise M1 and M2 are the merchandise tags registered in the merchandise tag DB 8*c*.

At a time point t0, tags Tg1 to Tg6 are registered for the users U1 and U2, the shops S1 and S2, and the merchandise M1 and M2, as illustrated.

Assume that at a time point t1, the user U1 executes a mutual assignment target action, such as a click, purchase, and favorite registration, on the merchandise M1 provided by the shop S1.

In the case, a tag is mutually assigned between the user U1 and the shop S1 and between the user U1 and the merchandise M1. The mutual assignment between the user U1 and the shop S1 assigns the tag Tg3 of the shop S1 to the user ID of the user U1 and the tag Tg1 of the user U1 is assigned to the shop ID of the shop S1. The mutual assignment between the user U1 and the merchandise M1 assigns the tag Tg5 of the merchandise M1 to the user ID of the user U1 and assigns the tag Tg1 of the user U1 to the merchandise ID of the merchandise M1. As a result, in the user tag DB 8*a*, to the user ID of the user U1, the tags Tg1, Tg3, and Tg5 are associated as the user tags. In the shop tag DB 8*b*, to the shop ID of the shop S1, the tags Tg1 and Tg3 are associated as the shop tags. In the merchandise tag DB 8*c*, to the merchandise ID of the merchandise M1, the tags Tg1 and Tg5 are associated as the merchandise tags.

Assume that the user U2 executes a mutual assignment target action, such as a click, on the advertisement of the shop S2 (page browse) at a time point t2.

In this case, the mutual assignment of the tag is executed between the user U2 and the shop S2. Accordingly, in the user tag DB 8*a*, the tags Tg2 and Tg4 are associated to the user ID of the user U2 as the user tags. In the shop tag DB 8*b*, the tags Tg2 and Tg4 are associated to the shop ID of the shop S2 as the shop tags.

Assume that the user U1 executes a mutual assignment target action, such as the click, on the advertisement of the shop S1 at a time point t3.

In the case, the mutual assignment of the tag is executed between the user U1 and the shop S2. In this case, the tags Tg3 and Tg1 assigned by the shop S1 to the user U1 are assigned for the second time. Accordingly, as shown in the parentheses, the tag point is set to "2." Similarly, in the shop S1 side, Tg3 and Tg1 among the tags Tg5, Tg3, and Tg1 assigned by the user U1 are assigned for the second time. Accordingly, as shown in the parentheses, the tag points are set to "2." The tag Tg5 is added.

Assume that at a time point t4, the user U2 executes a mutual assignment target action, such as a click, purchase, and favorite registration, on the merchandise M2 provided by the shop S1.

In the case, a tag is mutually assigned between the user U2 and the shop S1 and between the user U2 and the merchandise M2. As a result, the tag Tg6 is added to the user ID of the user U2, and the tags Tg1 to Tg6 are linked to the user ID. The tags Tg2 and Tg4 are added to the shop ID of the shop S1. The tags Tg2 and Tg4 are added to the merchandise ID of the merchandise M2.

A model of the tag mutual assignment is described above. Such tag mutual assignment is executed between a plurality of users, shops, and pieces of merchandise.

Figure 8:
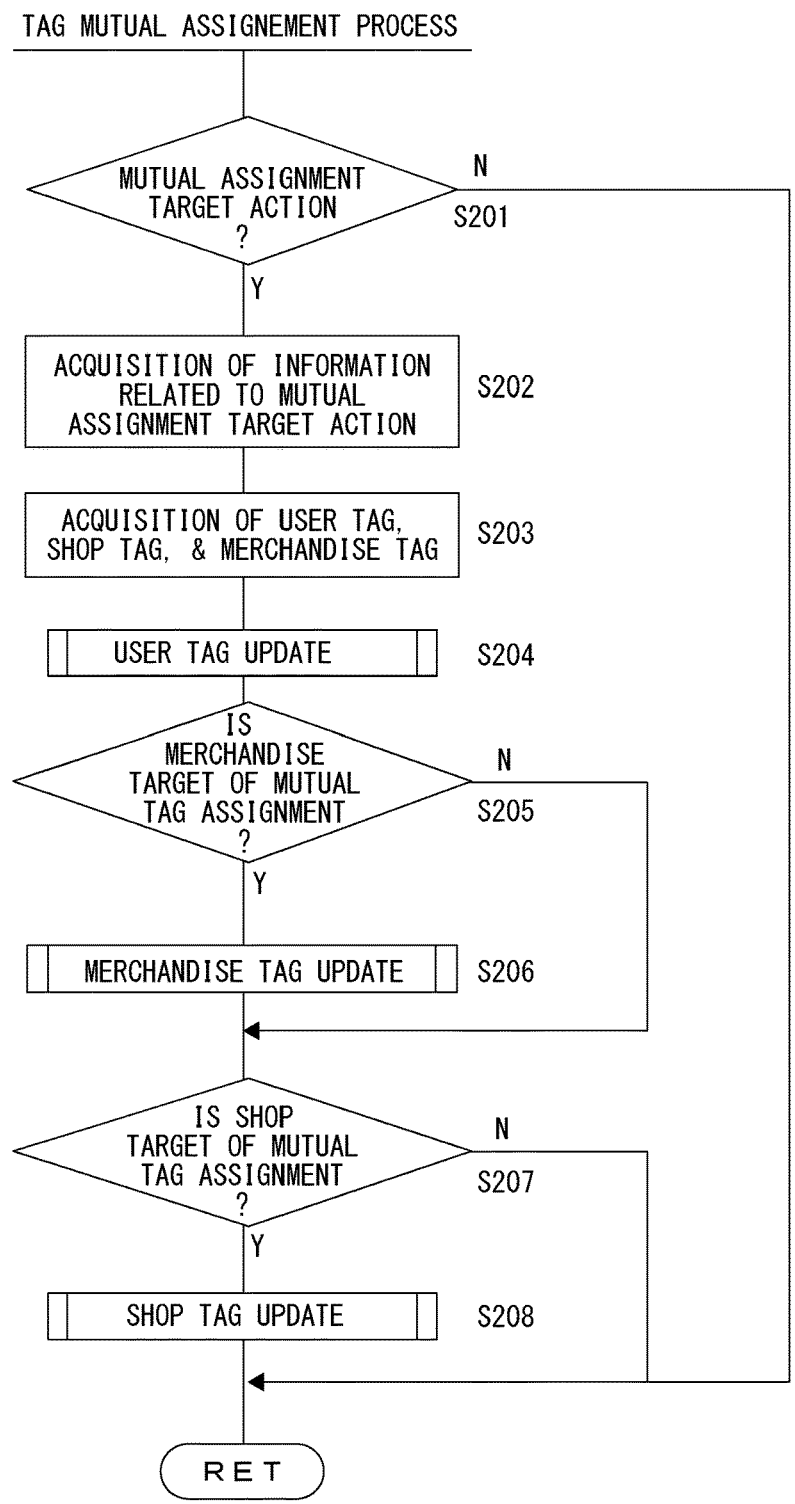
FIG. 8 is a flowchart of a tag mutual assignment process according to the embodiments.

FIG. 8 illustrates an example of the tag mutual assignment process by the tag management unit 25.

When, in response to a certain action in the user terminal 5 toward the EC server 2, the EC server 2 determines that the action is a mutual assignment target action as described above, the tag management unit 25 advances the processing from Step S201 to S202.

At Step S202, the tag management unit 25 acquires information on the mutual assignment target action. That is, as identification information on the mutual assignment target action, the tag management unit 25 acquires a user ID of the user who has executed the action and a shop ID or a merchandise ID, which is targeted for the action or both the shop ID and the merchandise ID, which are targeted for the action.

By this process, a set of identification information in the mutual assignment is specified. When acquiring the user ID and the shop ID, the mutual assignment is executed between the two. When acquiring the user ID and the merchandise ID, the mutual assignment is executed between the two. When acquiring the user ID, the shop ID, and the merchandise ID, the mutual assignment is executed both between the user ID and the shop ID and between the user ID and the merchandise ID.

At Step S203, the tag management unit 25 acquires a tag corresponding to the acquired identification information from the tag DB 8. That is, the tag management unit 25 reads the user tag associated to this user ID from the user tag DB 8*a*. In a case where a shop ID is acquired by the mutual assignment target action at this time along with the user ID, the shop tag associated to the shop ID is read from the shop tag DB 8*b*. In a case where a merchandise ID is acquired by the mutual assignment target action at this time along with the user ID, the merchandise tag associated to the merchandise ID is read from the merchandise tag DB 8*c*.

At Step S204, the tag management unit 25 updates the user tag DB 8*a*, such that the shop tag and the merchandise tag read at Step S203 are associated to the user ID as user tags. At this process, in a case where a certain merchandise tag to be assigned already existed as a user tag corresponding to this user ID, the tag point (assignment count) of the user tag is increased by one. If not, the tag point is set to 1 (the tag point=1).

When the tag management unit 25 acquires the merchandise ID at Step S202, for mutual assignment between both the user ID and the merchandise ID, the processing proceeds from Step S205 to S206. At Step S206, the tag management unit 25 updates the merchandise tag DB 8*c*, so as to associate the user tag read at Step S203 to the merchandise ID as a merchandise tag. In this case, when the merchandise tag identical to the user tag to be assigned has already existed, the tag point is increased. If not, the tag point is set to 1 (the tag point=1).

When the tag management unit 25 acquires the shop ID at Step S202, for mutual assignment between both the user ID and the shop ID, the processing proceeds from Step S207 to S208. At Step S208, the tag management unit 25 updates the shop tag DB 8*b*, so as to associate the user tag read at Step S203 to the shop ID as a shop tag. In this case, when the shop tag identical to the user tag to be assigned has already existed, the tag point is increased. If not, the tag point is set to 1 (the tag point=1).

The tag mutual assignment process is executed as described above. By such processing, the mutual assignment of tag as described in FIG. 7 is executed.

With such mutual assignment of a tag, tags of a user, a shop and merchandise are mutually collected in a course of a user action. Frequent execution of the collection render a tag reflecting individual preference of a user or the like dominant among the user tags. Meanwhile, among shop tags and merchandise tags, tags reflecting major preference to a shop or merchandise and concepts of a mass people become dominant.

First, regarding a user tag, respective users execute online shopping according to their own preference, necessity, or a similar reason to browse interested merchandise and shops and purchase merchandise. Accordingly, for the user ID of respective users, a tag assigned to a shop or merchandise the user has an interest in is to be collected.

However, a user does not always browse only merchandise of a fixed sort, and various merchandise and shops may be browsed for purchase. Meanwhile, the count of browses and the count of purchases on a merchandise category or a shop that a user has a major interest in usually exceeds those of merchandise or a shop that the user has less interest.

That is, a tag of considerable variety is collected for a user, according to an action such as the browse and purchase by the user. Nevertheless, the assignment count of the tags from a shop and merchandise a user is interested in increases. Accordingly, the tag point of such shop and merchandise ends up remarkably higher compared with the others. A tag with a high tag point can be considered as a dominant tag for a user. Thus, a tag reflecting the individual preference of a user becomes dominant as a user tag. In other words, among the tags associated to the user ID of a user, a tag with a high tag point is a tag representing preference, necessity, an environment, a situation, a purchase tendency, or a similar factor of the user.

The shop tag and the merchandise tag are conceivable as follows.

For example, in a case where a certain shop deals in merchandise for senior users, access by the senior users naturally increases. Accordingly, the mutual assignment of a tag frequently assigns tags owned by the senior users (for example, a tag indicative of the age bracket) to the shop tag of the shop and the merchandise tag of the dealt merchandise. Nevertheless, since young users also access the shop, a tag of the young users are assigned as well. However, in a case where most of the accessing user are senior users, the tag point of the tag indicative of the senior users increases.

Similarly, for example, with merchandise of a brand popular among young people, the tag point of a tag assigned by a user favoring the brand increases. With a shop that deals with organic foods, the tag point of a tag assigned by a user interested in organic foods increases.

Thus, regarding a shop tag and a merchandise tag, when the assignment count of a tag from a user interested in the shop and the merchandise increases, a dominant tag (a tag with a high tag point) conceivably reflects major preference by mass people to the shop and the merchandise, a concept of merchandise and a shop, a purchaser trend, or a similar factor.

As described above, since a user may have a variety of preference, need, and the like, frequent execution of the tag mutual assignment process may assign a tag uncharacteristic to respective identification information, specifically, a user, a shop, or a merchandise.

For example, assume a case where the user U1 has an interest in rock music and is currently raising a child. To the user U1, a tag "rock music" has been assigned. Meanwhile, assume that the user U2 is also raising a child, yet has no interest in rock music.

In this case, when the user U1 purchases the merchandise M1, or a certain nursery item, a tag "rock music" is assigned to the merchandise M1 by the mutual assignment. Afterwards, when the user U2 purchases identical merchandise M1, the tag "rock music", in which the user 2 has no interest, is assigned to the user 2.

Further, assume that the user U1 purchases a merchandise M2 of the shop S1 that deals in a brand BR1, which is generally unpopular among rock music fans. Nevertheless, the tag "rock music" is assigned to the shop S1 and the merchandise M2.

That is, an uncharacteristic tag has been assigned in the case of the user 1 and in the case of the shop S1 and the merchandise M2.

However, such assignment of an uncharacteristic tag is exceptional, so that an uncharacteristic tag does not normally results in a dominant tag with a high tag point. Accordingly, regarding a user, a shop and merchandise, whether or not a tag is characteristic to a user, a shop, or to merchandise can be determined appropriately based on a tag point.

Nevertheless, a tag point of a tag originally determined uncharacteristic may increase in value afterward. For example, assume that a large number of rock fans access the shop S1, following merchandise development by the above brand BR1 with a support from a prominent rock musician. As a result, the tag point of the tag "rock music" assigned to the shop S1 increases in value. At this point, the shop S1 has become a shop preferred by rock fans. Thus, the tag "rock music" can be considered as an appropriate tag for the shop S1.

Such procedure is also conceivable for a change of interest or preference by a user.

That is, a tag point indicates a degree of appropriateness for a user, a shop and merchandise at respective time point.

When tags are assigned to respective users, shops and merchandise in a great variety by mutual tag assignment, the load of mutual assignment process and that of the DB capacity increase. Further, when every tag owned by an assignment tag is configured to be assigned to an assignment destination in the mutual assignment, assigned contents of respective users, shops and products may converge in a substantially identical direction.

Thus, it is appropriate that a dominant tag with a high tag point is selected as an effective tag from an assignment source, and solely the effective tag is assigned to an assignment destination.

Figure 9:
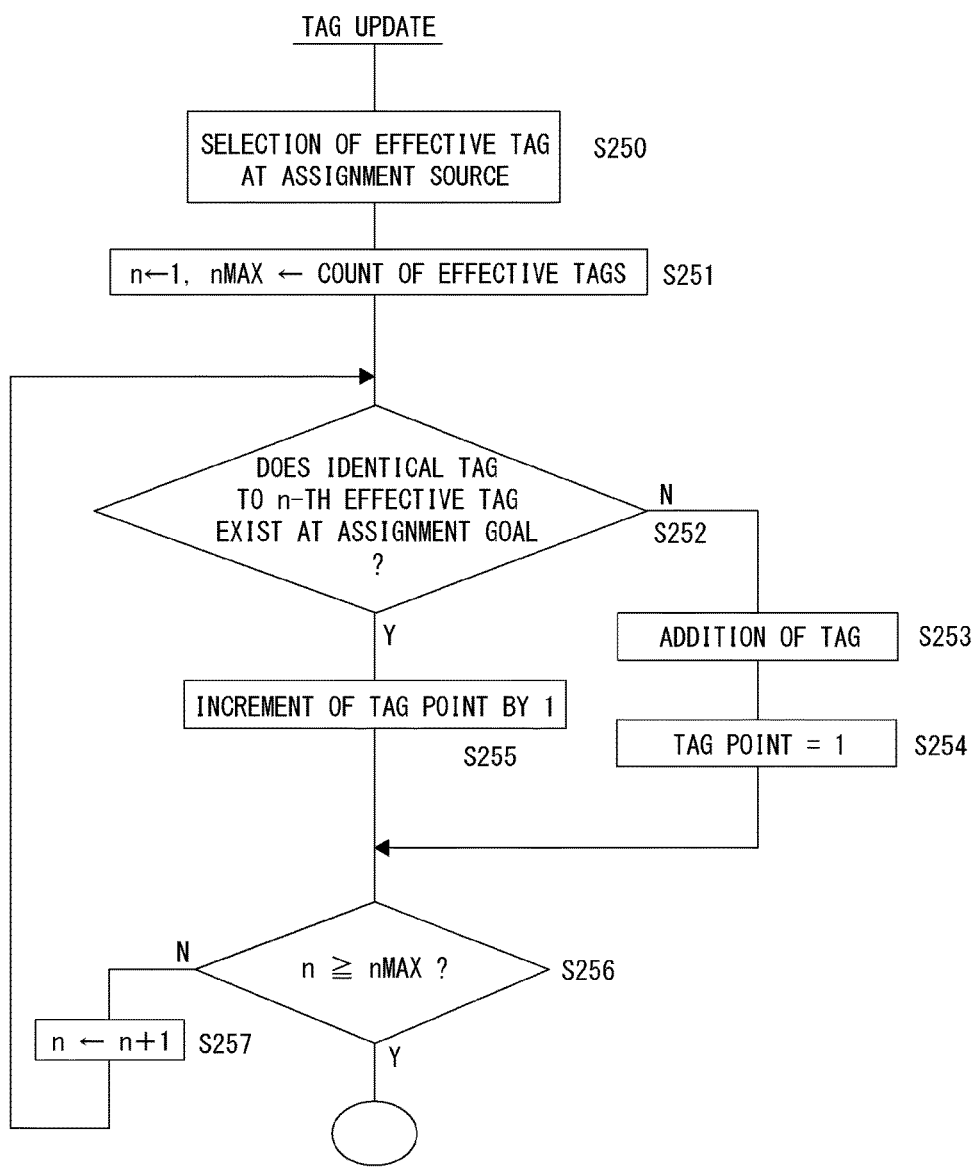
FIG. 9 is a flowchart of a tag update process according to the embodiments.

In view of this, the processing as in FIG. 9 is preferably executed at Steps S204, S206, and S208 in FIG. 8.

At Step S250, the tag management unit 25 selects an effective tag among tags of an assignment source that is targeted for mutual assignment. In case of the Step S204 in FIG. 8, an assignment source is a shop or merchandise and an assignment destination is a user. In the case of Step S206, an assignment source is a user and an assignment destination is merchandise. In the case of Step S208, an assignment source is a user and an assignment destination is a shop.

The effective tag of an assignment source, which is selected at Step S250 in FIG. 9, is, for example, assumed as a tag with a tag point equal to or higher than a predetermined threshold value.

At Step S251, the tag management unit 25 sets a variable n to 1 (n=1) and assigns a count of effective tags selected at Step S250 to a constant nMAX.

At Step S252, the tag management unit 25 checks whether or not a tag identical to the n-th effective tag exists at an assignment destination. If not, the n-th effective tag is added to the identification information of the assignment destination at Step S253 and the tag point of the added tag is set to "1" at Step S254. When a tag identical to the n-th effective tag exists at the assignment destination, the processing proceeds to Step S255, and the tag point of the tag corresponding to the identification information of the assignment destination is incremented by one.

By incrementing the variable n by one at Step S257, such processing is repeated until a condition at Step S255 is satisfied, that n is more than or equal to nMAX (n≥nMAX).

That is, the processes in FIG. 9 are processes to select one or a plurality of effective tags from an assignment source and assigns the respective effective tags to an assignment destination.

As in FIG. 9, in the tag mutual assignment process, the tag management unit 25 may be configured to additionally assign only an effective tag to the identification information of an assignment destination. Such effective tag may be selected from tags corresponding to the identification information of the assignment designation, based on, for example a predetermined condition on a tag point. With such processing, a processing load and a capacity load can be reduced and convergence of tags can be prevented.

A condition for determining an effective tag at Step S250 is not limited to a criterion based on a tag point. For example, in a case where a usual registration tag and a mutual assignment tag are managed as in FIG. 4 and FIG. 5, only a usual registration tag may be determined as an effective tag in the mutual assignment. Alternatively, a configuration where a usual registration tag is unconditionally determined as an effective tag and a mutual assignment tag with a tag point exceeding a threshold value is determined as an effective tag, may be conceivable.

Further, respective tags may be sorted based on a tag point, and tags ranking higher than x-th place, tags comprising upper x percent, or the like, may be determined as effective tags.

Additionally, a time condition may be used for determination. For example, a latest assignment time (the latest time at which a tag is newly registered or added by the usual registration process or the mutual assignment process) may be managed, and a tag that has not passed a predetermined duration since the latest assignment time may be determined as an effective tag.

Regarding a tag, a total count of a tag point varies, for example, from a frequently used tag to a rarely used tag. Thus, for the purpose of determining an effective tag, tag points may be normalized according to a total count of tag points of respective tags in the tag DB8.

For example, a tag such as "male" and "female" are frequently assigned, thus the total count of the tag point in the tag DB8 is expected to reach a considerably high value. Meanwhile, the assignment count of a relatively unusual tag is small, and the total count of the tag point in the tag DB8 is low in value. Therefore, a tag point of a tag corresponding to a certain identification information is preferably normalized as a division of the tag point by the total count of tag points in the tag DB 8 ([the tag point]/[the total count of tag points in the tag DB8]), then a normalized value is compared with a threshold value to determine whether or not the tag is an effective tag.

Further, a tag other than an effective tag may be excluded from a mutual assignment target, and a tag contradicting with an effective tag of an assignment destination may also be excluded from a mutual assignment target. In other words, a contradicting tag is not determined as an effective tag.

For example, in a case where a tag "white" is added to an assignment destination having an effective tag "red", the tag "white" is not determined as an effective tag and excluded from the mutual assignment, even if the tag "white" is an effective tag in terms of a tag point.

As a DB management configuration, an effective tag flag may be provided to respective tags, so that the effective tag flag indicates whether or not the tag is an effective tag. The tag management unit 25 executes effective tag determination with various conditions as provided, and updates an effective tag flag.

Preferably, the tag management unit 25 manages the tag DB 8 at appropriate timing, so that a condition is maintained where an appropriate tag is associated to respective user IDs, respective shop IDs, and respective merchandise IDs under a situation where mutual assignment of tags is frequently executed among users, shops, and merchandise.

For example, regarding the user tag DB 8*a*, the shop tag DB 8*b*, the merchandise DB 8*c*, a tag may be, either periodically or non-periodically, deleted in the following manners from (1) to (6).

(1) As a periodic process, a tag with a tag point lower than a predetermined value is deleted.

(2) A latest assignment time point of a tag is managed. A tag with a tag point equal to or less than a predetermined tag point after a predetermined period since the latest assignment time point is deleted. That is, a tag that is possibly assigned exceptionally, is deleted.

(3) Regardless of a tag point, a tag that has passed a predetermined period (for example, a year) since the latest assignment time point, is deleted. That is, a tag that has not been assigned for a long period is deleted.

(4) All the tag points are configured to be subtracted by 1 at every predetermined period (for example, a month). A tag is deleted when the tag point reaches "0". This leaves only the tags continuously and repeatedly assigned.

(5) As a periodic process, a count of tags corresponding to respective identification information is reduced to a predetermined count "m". For example, only a tag with a tag point ranking equal to or higher than a top "m"-th place is kept and the others are deleted. Regarding the kept "m" number of tags, respective tag points may be set to 1.

(6) For example, as a periodic process, among a plurality of tags corresponding to certain identification information, a contradicting tag is detected, and the contradicting tag is deleted. For example, in a case where a tag "red" and a tag "white" are associated to identical identification information, one or both of the tags are deleted. When deleting one of the tags, for example, a tag with a lower tag point is treated as a deletion target. Alternatively, when a usual registration tag contradicts with a mutual assignment tag, the mutual assignment tag may be a deletion target.

Tag management as described in the above examples, for example, can constrain growth of tags corresponding to identification information and undo registration of an inappropriate tag.

Additionally, a maximum count of tags corresponding to a piece of identification information may be set such that a tag is not added when the addition results in exceeding the maximum count. In a case where identification information reaches a maximum count in tags, a tag can be added to the identification information, for example, as an assignment destination in the mutual assignment, only after tag deletion, such as the above (1) to (5), makes space. The configuration as such can also constrain the growth of the count of tags corresponding to identification information.

5. Tag Use Process Example

As described above, the tag management unit 25 sequentially updates the tag DB 8. The following describes a process example using the tag corresponding to each piece of identification information in the tag DB 8 at each time point.

The following Tag Use Process Examples I to V are processes executed by the EC server 2, mainly by the functions of the tag processing unit 26, the web server 22, and the search unit 24.

Specifically, the following Tag Use Process Examples I to V are executed, triggered by detection of a tag process target action of a user by the EC server 2.

Tag Use Process Example I

Figure 10:
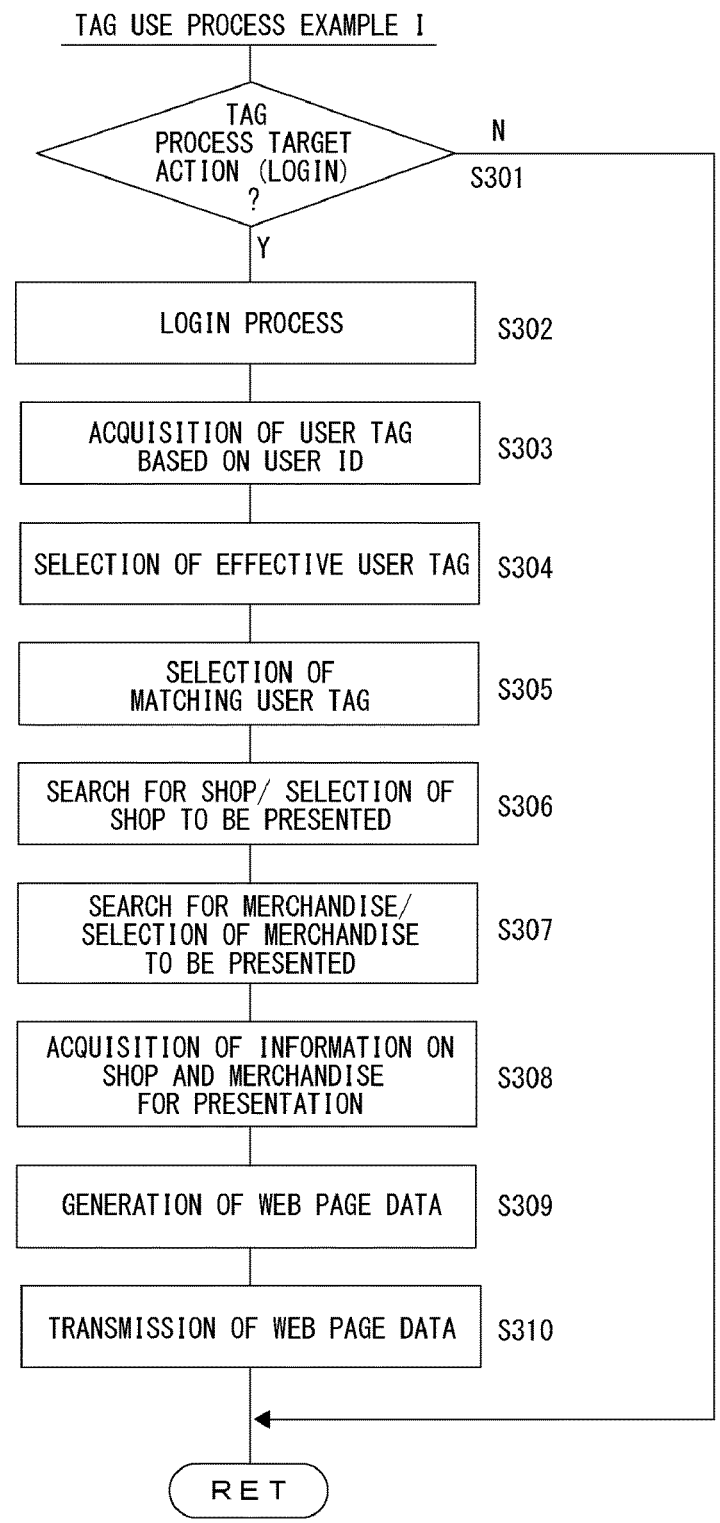
FIG. 10 is a flowchart of a tag use process example I according to the embodiments.
Figure 11:
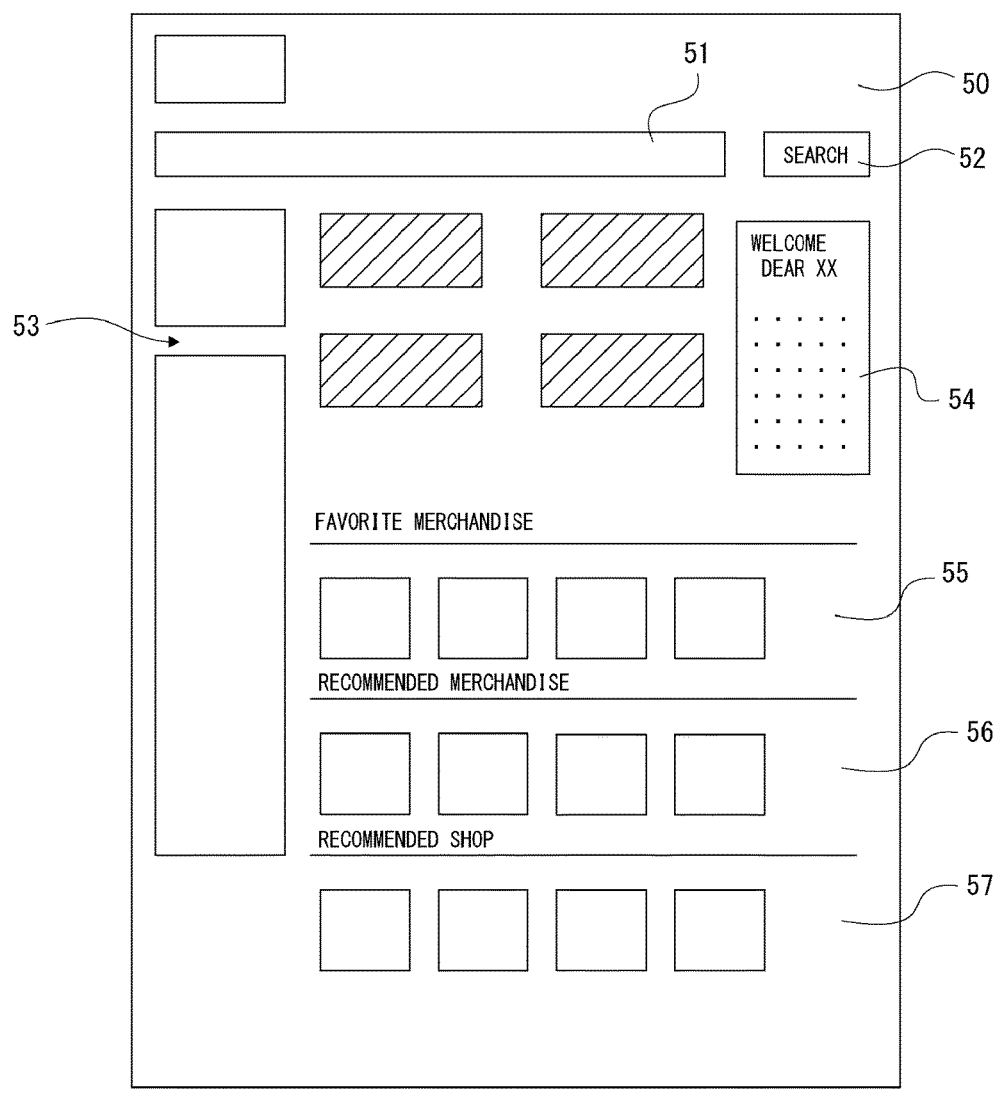
FIG. 11 is an explanatory view of a presentation state according to the embodiments.

The Tag Use Process example I, described in FIG. 10 and FIG. 11, is an example where, for example, a login by a user is assumed as a tag process target action, and the information presentation preferable for the user on a login screen is achieved based on a tag.

When the EC server 2 detects a login as a tag process target action at Step S301 in FIG. 10, the EC server 2 advances the processing to Step S302, and executes a login process by the function of the management unit 23. The EC server 2 executes the processes at Steps S303 to S307 by the function of the tag processing unit 26.

First, at Step S303, the tag processing unit 26 acquires a user ID determined by the login process and searches the user tag DB 8*a* based on the user ID to acquire a user tag corresponding to the user ID.

At Step S304, the tag processing unit 26 selects an effective user tag among the acquired user tags. For example, a tag with a tag point equal to or higher than a predetermined value is determined as an effective user tag.

Alternatively, the tags may be sorted by a tag point, and a predetermined count of the top tags may be determined as effective user tags.

At Step S305, the tag processing unit 26 selects y pieces ("y" is one or a plural) of matching user tags used for matching with a shop tag and a merchandise tag, among the selected user tags. Such selection is, for example, configured as follows: when the count of effective user tags is equal to or less than "y" pieces, the effective user tags are all set as matching user tags. Alternatively, when the count of effective user tags is more than y pieces, y pieces are randomly selected among the effective user tags and are set as matching user tags.

At Step S306, the tag processing unit 26 searches the shop tag DB 8b with a matching user tag and extracts a shop ID to which the tag of an identical content is associated. For example, when matching user tags are "credited" and "business shoes", the tag processing unit 26 searches a shop ID including these tags as the shop tags.

At this process, preferably, an effective shop tag is targeted in the search of a shop tag identical to a user tag. For example, among shop tags, a tag with a tag point equal to or higher than a predetermined value is determined as an effective shop tag and set as a search target.

After extracting matching shop IDs, a shop to be presented to a user is selected from the shop IDs. For example, a predetermined count of shops may be selected, based on the count of presented frames of recommended shops on a web page or a similar parameter. The tag processing unit 26 may select shops randomly or may select the shops based on the evaluation, achievement, or similar factor of shops.

Similarly, at Step S307, the tag processing unit 26 searches a merchandise tag DB 8c using a matching user tag to extract a merchandise ID to which the tag of an identical content is associated. For example, as the above-described process, the tag processing unit 26 searches a merchandise ID having "credited" and "business shoes" as the merchandise tags, which are identical to the matching user tags.

In this case as well, preferably, an effective merchandise tag is targeted in the search of a merchandise tag identical to a user tag. For example, among merchandise tags, a tag with a tag point equal to or higher than a predetermined value is determined as an effective merchandise tag and set as a search target.

After extracting matching merchandise IDs, merchandise to be presented to a user is selected from the merchandise IDs. For example, a predetermined count of merchandise on a web page according to the count of presented frames of recommended merchandise or a similar parameter. The tag processing unit 26 may select merchandise randomly or may select merchandise based on the sales achievement, timing of sale release, or similar factor of merchandise.

By the processes described above, the tag processing unit 26 has extracted a shop ID and a merchandise ID. The shop ID has a shop tag identical to a user tag of a logged-in user, and the merchandise ID had a merchandise tag identical to a user tag of the logged-in user. Further, the shop ID and the merchandise ID are used to generate presentation information.

At Step S308, the search unit 24 acquires the information on the shop and the merchandise to be presented based on these shop ID and merchandise ID. For example, the search unit 24 searches the advertisement DB 6e to acquire the advertisement data regarding these shop ID and merchandise ID. Alternatively, the search unit 24 may search the shop DB 6b and the merchandise DB 6c to acquire the shop and merchandise data.

Then, the search unit 24 transmits the information on the acquired shop and merchandise (or a link to the information) to the web server 22.

The web server 22 generates a web page data at Step S309. In response to login, the web server 22 generates page data to display, for example, a page as illustrated in FIG. 11 on the browser of the user terminal 5.

FIG. 11 is an example of a screen in a state where a user has logged in to a website for the electronic commerce system (a login screen 50). The login screen 50 displays, for example, a search box 51 and a search execution button 52. The login screen 50 also includes an advertising area 53, a user information area 54, a favorite merchandise area 55, a recommended merchandise area 56, a recommended shop area 57, or a similar area. The advertising area 53 displays various advertisements. The user information area 54 displays the user information. The favorite merchandise area 55 displays favorite merchandise of the user. The recommended merchandise area 56 displays recommended merchandise to the user. The recommended shop area 57 displays a recommended shop to the user.

The web server 22 generates the HTML data as the login screen 50. At the process, the web server 22 inserts an HTML tag and text information, sets a URL link, or performing a similar operation to cause the browser of the user terminal 5 to read an image of the advertisement, the favorite merchandise, the recommended merchandise, the recommended shop, or similar information. Specifically, in case of this example, the recommended merchandise area 56 displays the image or similar data of the merchandise searched at Step S308. Additionally, the recommended shop area 57 displays the image and the text of the shop searched at Step S308.

After the web server 22 has generated the web page as such, at Step S310, the communications unit 21 transmits the HTML data as the page data to the user terminal 5. Then, the user terminal 5 displays the login screen 50 as illustrated in FIG. 11 on the browser.

Accordingly, the login screen 50 presents the information on the merchandise and the shop, which are generated using the user tag, as the recommended merchandise and the recommended shop to the user. Particularly, since the recommended merchandise and the recommended shop presented are the merchandise and the shop having tags common the user, the recommended merchandise and the recommended shop are more likely to attract the user's attention. Especially, since an effective user tag is selected and used at Step S304, the recommended merchandise and the recommended shop are considerably more likely to attract the user's interest. Thus, information presentation desirable for the user is achieved.

At Step S304, among effective user tags, for example, matching user tags are randomly selected. Thus, different recommended shops and merchandise can be presented at each login. In all the cases, the merchandise and the shops estimated as highly interesting to a user is presented. This achieves presentation of various merchandise and shops interested by the user.

The criterion on an effective user tag, an effective shop tag, and an effective merchandise tag may conceivably be other than a tag point, which is described above. For example, a usual registration tag may be an effective tag. A condition of elapsed time since a latest assignment time point of a tag may also be used for effective tag determination.

Further, in a case where an effective tag flag is provided for the respective tags in the tag DB 8 as described above, whether or not each tag is an effective tag can also be determined by the effective tag flag.

In this example, login is used as an example of a tag process target action. However, also in a case where a tag process target action does not directly relate to a merchandise ID and a shop ID, such as a search operation by the user, a shop ID and a merchandise ID can also be extracted from the tags acquired from the user ID, and the IDs can be used for generating various presentation information.

Tag Use Process Example II

Figure 12:
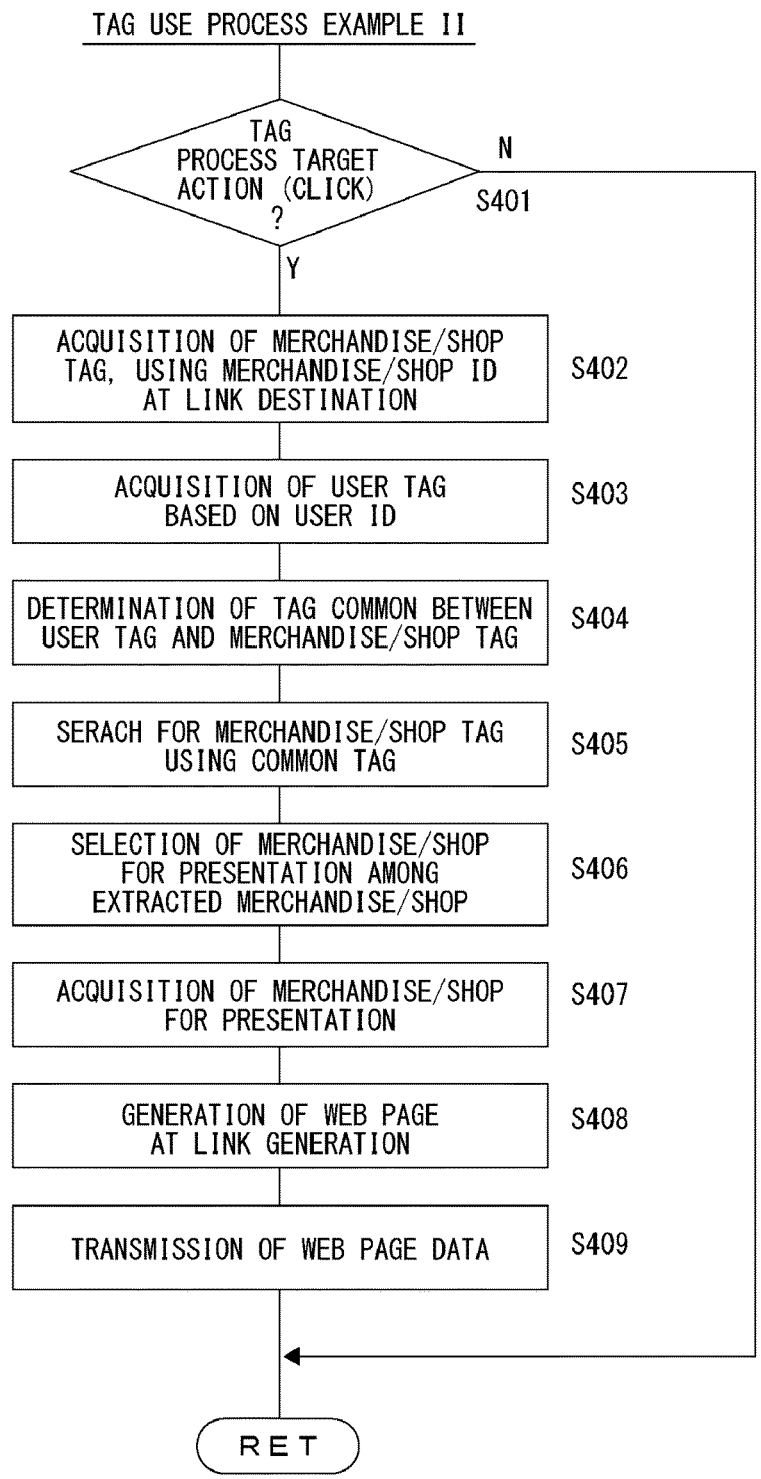
FIG. 12 is a flowchart of a tag use process example II according to the embodiments.

The tag use process example II, which is described in FIG. 12, is an example where, for example, a click on a link to a shop or merchandise (transition to a shop page or a merchandise page) is assumed as a tag process target action, and preferable information presentation for a user on the link page is achieved based on a tag.

At Step S401 in FIG. 12, when the EC server 2 detects a click on a link, for example, a click on an advertisement or similar data as a tag process target action, the EC server 2 executes the processes at Steps S402 to S406 by the functions of the tag processing unit 26.

As a user tag, a merchandise tag, and a shop tag described in FIG. 12, it is preferable to target exclusively the above-described effective user tag, effective merchandise tag, and effective shop tag.

First, at Step S402, the tag processing unit 26 acquires a merchandise ID (or a shop ID) of the merchandise (or shop) at a link destination. The tag processing unit 26 searches the merchandise tag DB 8c (or the shop tag DB 8b) using the ID to acquire a merchandise tag (or a shop tag) corresponding to the ID. In a case where the link click is a transition operation to a merchandise page, the tag processing unit 26 acquires merchandise tag. In a case where the link click is a transition operation to a shop page, the tag processing unit 26 acquires a shop tag.

At Step S403, the tag processing unit 26 searches the user tag DB 8a based on the user ID of the logged-in user who has executed the link click, and acquires the user tags corresponding to this user ID.

At Step S404, the tag processing unit 26 determines a tag common between the acquired user tag and the merchandise tag (or the shop tag). For example, when the acquired user tags include a brand "BR-A" and the merchandise tags also include the "BR-A", the "BR-A" is determined as a common tag.

At Step S405, the tag processing unit 26 uses a determined common tag to search the merchandise tag DB 8c (or the shop tag DB 8b). The tag processing unit 26 searches another piece of merchandise (or another shop) that includes a merchandise tag (or the shop tag) identical to the common tag, so as to acquire the merchandise ID (or the shop ID).

At Step S406, the tag processing unit 26 selects a predetermined count of merchandise IDs (or the shop IDs), which are used to generate presentation information among merchandise IDs (or shop IDs) acquired at Step S405. A predetermined count may be selected, for example, randomly. However, selection may be based on sales achievement of merchandise or a shop. A predetermined count is a count for a recommended pieces of merchandise (or a shop) to be presented.

By the processes described above, the tag processing unit 26 has extracted a shop ID or a merchandise ID used to generate presentation information.

At Step S407, based on the shop ID or merchandise ID, the tag processing unit 26 acquires the information on the shop and the merchandise to be presented by the search unit 24. The tag processing unit 26 transmits the acquired information on the shop and the merchandise (or the link to the information) to the web server 22.

At Step S408, the web server 22 generates web page data at the link destination. That is, the web server 22 reads the page data of the link targeted by the click operation. At this timing, areas for the recommended merchandise and the recommended shop are prepared in the page data at the link destination. The web server 22 inserts the information on the merchandise and the shop acquired at Step S407, for example, the advertisement information.

When the web server 22 thus generates the web page, the communications unit 21 transmits the page data to the user terminal 5 at Step S409. The user terminal 5 displays a page image at the link destination on the browser.

Accordingly, when browsing a page on the desired merchandise and shop, a user can view information on other merchandise and shops in the page. Such information is the information on the merchandise and the shop having a common merchandise tag of the merchandise on this page (or the shop tag of the shop on the page) identical to the user tag. Accordingly, in terms of preference and similar factors, and in terms of a purpose of web page browsing, such information is desirable for a user. For example, such information may be on merchandise related to a piece of merchandise of the page, or may be on a shop sharing merchandise in deal or a concept. That is, the information assumedly desired for view by a user is presented.

Further, by randomly selecting a predetermined count of merchandise IDs (or shop IDs), a case where an identical information is presented at every page transition to a particular page is avoided, and varied information presentation is realized.

In this example, a click on a link to merchandise and a shop is described as an example of a tag process target action. However, a case where a merchandise ID and a shop ID are related by a tag process target action, such as purchase of merchandise by a user, registration of merchandise and a shop as favorite, or a similar operation, is also determined as a tag process target action, and such case can be processed as described in FIG. 12.

Tag Use Process Example III

Figure 13:
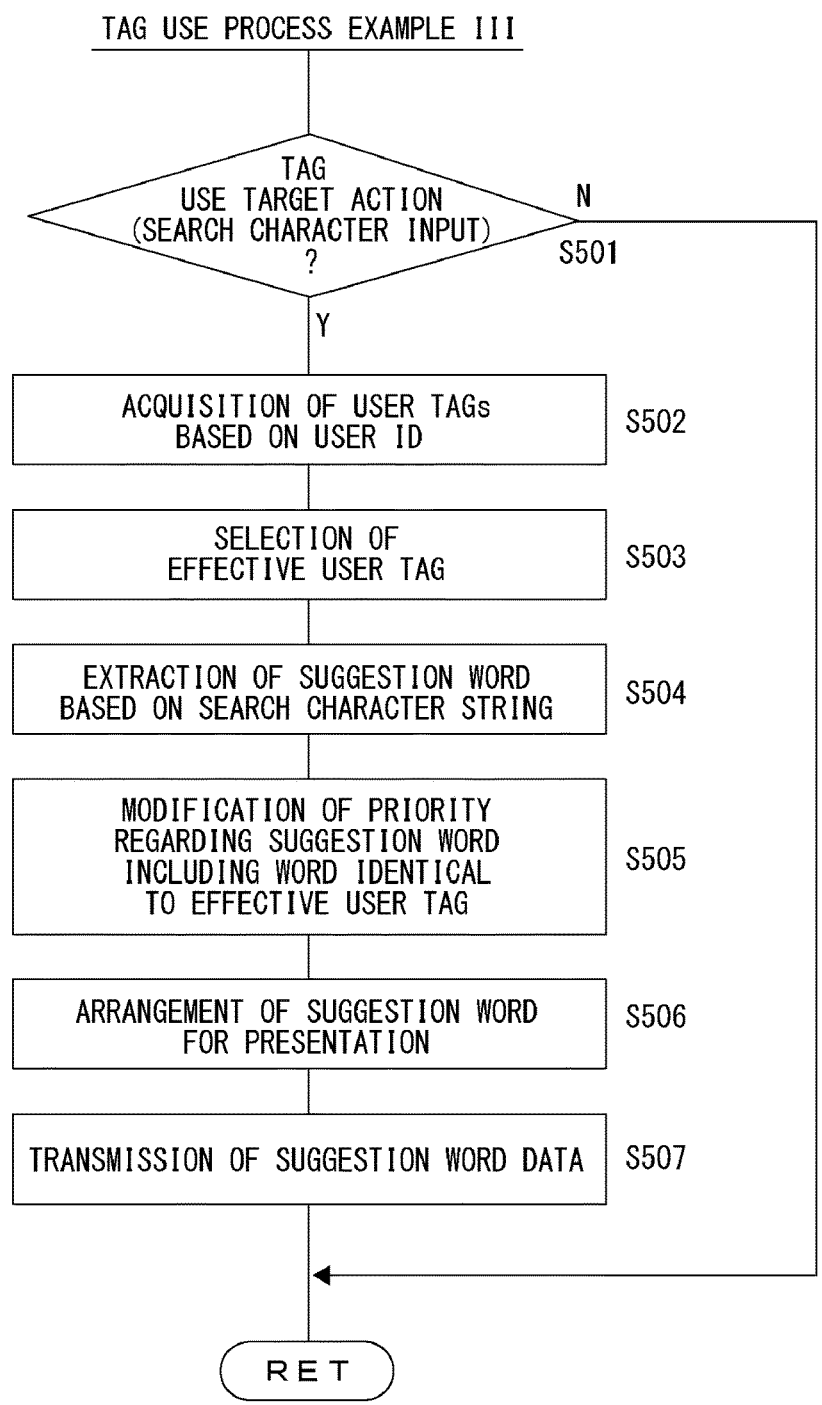
FIG. 13 is a flowchart of a tag use process example III according to the embodiments.

The tag use process example III described in FIG. 13 and FIG. 14 is an example where a search character input by a user is assumed as the tag process target action, and a tag is used to present a suggestion word.

At Step S501 in FIG. 13, upon detecting input of a search character as a tag process target action, the EC server 2 executes the processes at Steps S502 and S503 by the functions of the tag processing unit 26. Input of a search character refers to, for example, a character input to the search box 51 in FIG. 11.

At Step S502, the tag processing unit 26 searches the user tag DB 8a based on the user ID of a logged-in user who has executed the search character input and, acquires a user tag corresponding to the user ID.

The tag processing unit 26 also selects an effective user tag among the user tags acquired at Step S503. An effective user tag is used to generate presentation information.

Meanwhile, in response to the search character input, the EC server 2 searches the suggestion word DB 6d by the function of the search unit 24, and extracts a suggestion word corresponding to an input character string at Step S404. Thus, a plurality of suggestion words matching in terms of phonetic representation are acquired.

The EC server 2, for example, selects a suggestion word presented by the function of the search unit 24, and arranges a presentation order. The presentation order depends on, for example, a priority set for the respective suggestion words in the suggestion word DB 6d. The priority is determined, for example, based on a count of search executions of the respective suggestion words.

At this timing, the search unit 24 at Step S505, modifies the numerical value of priority using the effective user tag acquired at Step S503. This modification is temporary and made for the purpose of selecting and arranging an order of a suggestion word for current presentation. Thus, a priority stored in the suggestion DB 6d is not updated.

At Step S506, the search unit 24 uses the priority after modification to select a predetermined count of suggestion words and arrange a presentation order of the suggestion words.

At Step S507, the EC server 2 transmits information on the suggestion words, for which a presentation order has been set, from the communications unit 2 to the user terminal 5 to cause the user terminal to present the suggestion words.

Figure 14A:
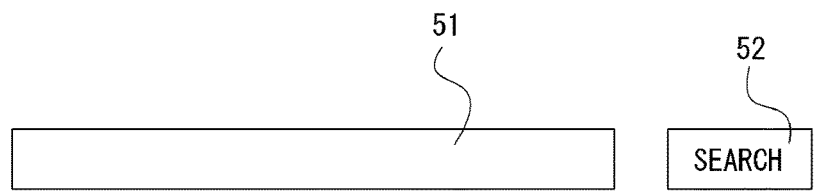
FIG. 14A and FIG. 14B are explanatory views of a presentation state according to the embodiments.

Figures in FIG. 14 illustrate a state of suggestion words presentation. FIG. 14A illustrates a search box 51 and a search execution button 52 displayed on the user terminal 5.

Figure 14B:
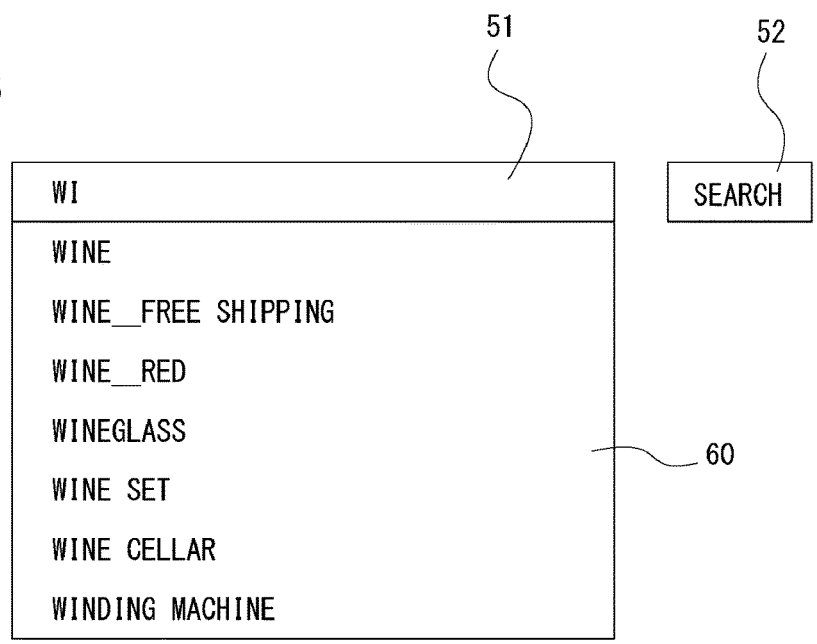

For example, assume that a user inputs "WI" in the search box 51 as illustrated in FIG. 14B. In this case, suggestion words including the phonetic representation "wai", "WI" is acquired from the suggestion word DB 6d. Meanwhile, assume that "free shipping" exists as an effective user tag of the user who has executed the input. In this case, among a plurality of extracted suggestion words, a suggestion word including the words identical to an effective user tag, "wine free shipping", is given higher priority. In this state, the suggestion words are sorted by the priority of the respective suggestion words. This increase a probability that "wine free shipping" is selected at a higher rank. For example, as illustrated in the drawing, "wine free shipping" is set at the second highest priority next to "wine" and is displayed in a suggest box 60. A user can perform search by selecting a suggestion word as an input character string.

Thus, a suggestion word of a search character string including a word identical to a user tag is presented to a user. Accordingly, a suggestion word relevant to preference and desire of a user is more likely to be presented, and presentation of a suggestion word desirable for the user is facilitated.

Tag Use Process Example IV

Figure 15:
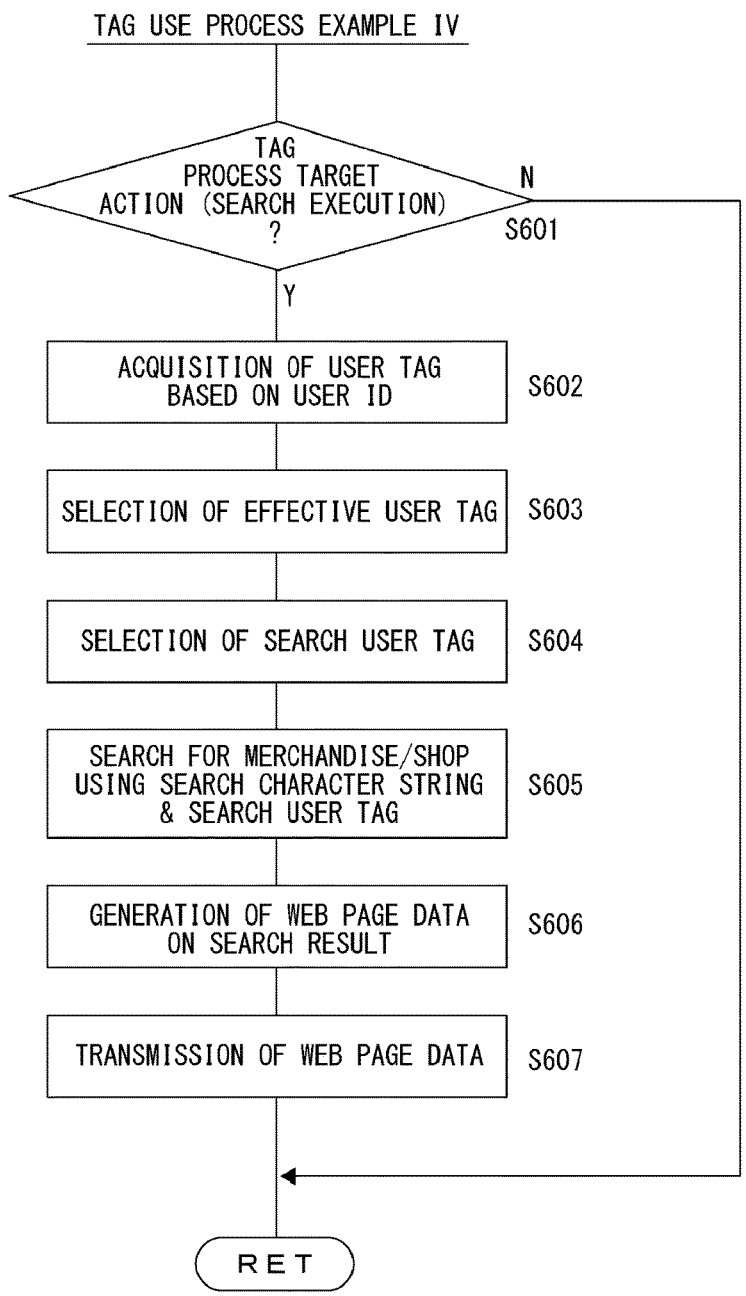
FIG. 15 is a flowchart of a tag use process example IV according to the embodiments.

The tag use process example IV described in FIG. 15 is an example where search execution by a user is assumed as a tag process target action, and a tag is used for the process of presenting a search result.

At Step S601 in FIG. 15, upon detecting search execution as a tag process target action, the EC server 2 executes the processes at Steps S602 to S604 by the functions of the tag processing unit 26.

Search execution refers to, for example, an operation to click the search execution button 52 after inputting a character to the search box 51 in FIG. 11 (or selecting a suggestion word).

At Step S602, the tag processing unit 26 searches the user tag DB 8a based on a user ID of the user to acquire the user tag corresponding to the user ID.

At Step S603, the tag processing unit 26 selects an effective user tag among the acquired user tags.

Further, at Step S604, the tag processing unit 26 selects a search user tag to be used for a search process among the selected user tags.

The selection may be executed, for example, randomly. Alternatively, a user tag with a top tag point or a predetermined count of user tags from the top may be selected.

With the above processes, the tag processing unit 26 has extracted a user tag used for generating presentation information, among the user tags of the logged-in user.

Subsequently, the EC server 2 executes a search process by the function of the search unit 24 at Step S605. The search unit 24 generally searches, for example, the merchandise DB 6c or the shop DB 6b, and extracts merchandise or a shop having an identical word to a character string inputted in the search box 51 by a user. However, in this example, the search unit 24 adds the selected search user tag for at Step S604, to the search character string, and searches merchandise or a shop, based on the character string.

When obtaining the search result, at Step S606, the EC server 2 generates HTML data of the search result page by the function of the web server 22. The HTML data is the page data presenting the search result list. At Step S607, this page data is transmitted from the communication unit 21 to the user terminal 5. Accordingly, the user can view the search result list.

In this case, a user tag is used as a search string. Thus, merchandise or a shop hit by a search user tag is extracted in a top rank among shops and merchandise. Accordingly, among merchandise and shops hit by an input search character string, merchandise or a shop particularly matching preference or a similar factor of a user is likely to be presented in a top rank in a search result. Thus, the search result is more likely to suit demand of a user.

However, merchandise and shops which are not hit by a search user tag may also be placed on a search list, preserving character input by a user.

The example in FIG. 15 executes the search adding a search user tag to a search character string. However, the search result obtained with an input search string may be sorted and filtered using a search user tag. For example, when acquiring a merchandise ID and a shop ID as a search result, the merchandise tag DB 8c and the shop tag DB 8b are searched for these IDs to confirm whether the ID has a merchandise tag and a shop tag identical to a search user tag as an effective tag or not. The merchandise and the shop having the tag identical to the search user tag are configured so as to be displayed in a top rank in the search result list by sorting, or only the merchandise and the shops having the identical tag are configured to be extracted as the search result. Thus, a tag can also be used to generate presentation information as a search result.

Tag Use Process Example V

Figure 16:
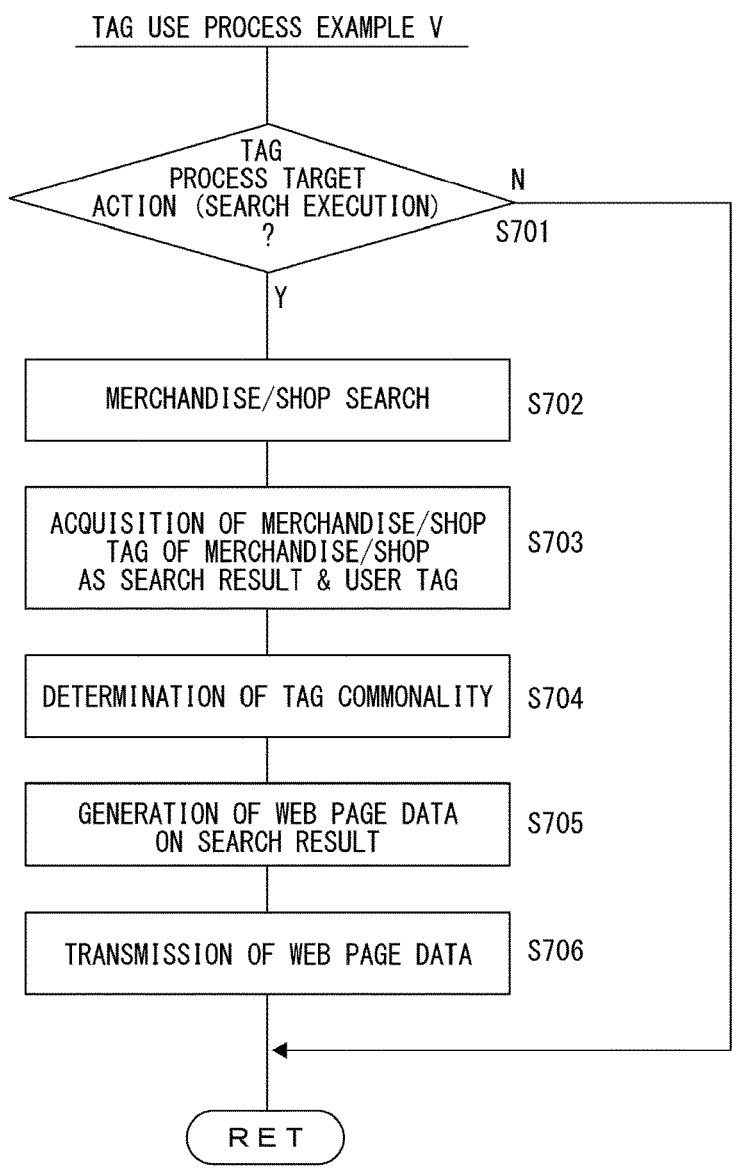
FIG. 16 is a flowchart of a tag use process example V according to the embodiment.

As in the Tag Use Process Example IV, the Tag Use Process Example V described in FIG. 16 is an example where search execution by a user is assumed as a tag process target action, and a tag is used for the process to present a search result.

Preferably, the respective targets to be considered as a user tag, a merchandise tag, and a shop tag in FIG. 16, are an effective user tag, an effective merchandise tag, or an effective shop tag, as described above.

Upon detecting search execution as the tag process target action at Step S701 in FIG. 16, the EC server 2 executes the processes of Steps S702 to S704 by the functions of the search unit 24 and the tag processing unit 26.

That is, the EC server 2 executes the search process by the function of the search unit 24 at Step S702. The search unit 24, for example, searches the merchandise DB 6c or the shop DB 6b by a character string inputted to the search box 51 by the user to extract merchandise and shop IDs having a matching word.

Upon obtaining a search result, at Step S603, the EC server 2 acquires a merchandise tag (or a shop tag) regarding the respective merchandise and shops searched by the function of the tag processing unit 26. In addition, the EC server 2 acquires a user tag from the user ID of current processing.

At Step S704, the EC server 2 determines a tag commonality degree between the respective merchandise ID or shop ID extracted by the search process with a user of the current processing.

For example, assume that merchandise M1, M2 . . . , and Mn are extracted by a search. A tag commonality degree between the merchandise M1 and a user tag is obtained based on a count of shared tags, or a ratio of shared tags among tags as a whole. Similarly, commonality degrees are obtained regarding the merchandise from M2 to Mn.

After obtaining a commonality degree in such a manner, at Step S705, the EC server 2 generates HTML data of a search result page by the function of the web server 22. That is, the HTML data is page data for presenting a search result list. In this case, the search result list is assumed to be sorted by commonality degrees.

At Step S706, the communications unit 21 transmits this page data to the user terminal 5. Accordingly, a user can view the search result list.

In such a case, merchandise or a shop which is hit by a search character string inputted by a user and shares a good number of tags identical to user tags of the user is presented to the user with priority. Accordingly, a search result is likely to match the demand of a user.

Alternatively, a commonality degree may be used for narrowing a search, other than for sorting. For example, only the merchandise or shop having an identical tag to a user tag is configured to be presented as a search result.

In the example in FIG. 16, the tag information is extracted based on a tag process target action, the extracted tag information is set as tag information used to generate the presentation information. Alternatively, However, identification information is extracted based on the tag process target action and the extracted identification information is set as the identification information used to generate presentation information.

For example, the merchandise tag DB 8c or the shop tag DB 8b is searched with a character string inputted to the search box 51 by a user to extract the merchandise and the shop having a matching tag. The extracted merchandise ID or shop ID is used to generate presentation information as a search result.

Merchandise and a shop is extracted based on an AND condition or a OR condition using, a merchandise ID or a shop ID extracted by a usual search process as in Step S702, and a merchandise ID or a shop ID extracted by tag search. Then, HTML data of a search result page is generated.

A search result reflecting tags can also be presented to a user by such processing.

6. Summary and Modifications

The following effects are obtained by the above embodiments.

By the function of the tag management unit 25, the EC server 2 of the embodiments is configured to execute a tag mutual assignment process (see FIG. 8 and FIG. 9) on the tag DB 8. The tag DB 8 is configured to store tags. The tags correspond to respective pieces of identification information as the user ID of individual users, the shop ID of individual shops, and the merchandise ID of individual pieces of merchandise. In response to a mutual assignment target action from the user terminal 5, the tag mutual assignment process is configured to realize a state where mutual assignment of the tags is executed mutually between a user ID and either a shop ID or a merchandise ID related to the mutual assignment target action.

With the tag mutual assignment process, a tag reflecting individual preference and demand of a user becomes dominant among the tags associated to a user ID. Among the tags associated to a shop ID and a merchandise ID, a tag reflecting major preference, demand, concept, or a similar request by numerous users favoring a shop and merchandise becomes dominant. That is, the tag mutual assignment process achieves tag assignment appropriate for generating presentation information for each user on respective users, shops, and merchandise.

Based on mutual assignment target actions by numerous users, a word representing the preference of respective users or a similar word are naturally accumulated as user tags, shop tags, and merchandise tags. Thus, tags suitable for a user, a shop and merchandise are associated as dominant tags, without conducting a complicated user behavior analysis, questionnaire, merchandise information analysis, shop information analysis, or a similar analysis.

In response to a tag process target action in the user terminal 5, the EC server 2 searches the tag DB 8 for tags corresponding to the user ID, the shop ID, or the merchandise ID related to the tag process target action, by the function of the tag processing unit 26, and, based on the extracted tags, acquires a tag or identification information used to generate presentation information to be transmitted to the user terminal 5. The search unit 24 and the web server 22, which function as the presentation information generating unit, use the tag or the identification information acquired by the tag processing unit 26 to generate the presentation to be information transmitted to the user terminal.

The presentation information is, as exemplified in the Tag Use Process Examples I to V, a login screen, a merchandise page, recommended merchandise on a shop page, a recommended shop, an advertising image, a search result list, a suggestion word in a search, or similar information.

In the tag DB 8, regarding a user, a shop and merchandise, appropriate respective user tags, shop tags, and merchandise tags are assigned (rendered dominant) by the above-described tag mutual assignment process. Accordingly, generating the presentation information based on the tag and the identification information acquired from the tag DB 8 enables information presentation highly suitable for a user. For example, presentation of a shop or merchandise that matches tendencies of individual preference of a user, major preference and demand toward a shop or merchandise, and for example, a concept of a shop or merchandise can be realized.

Specifically, a recommendation display of merchandise and shops, advertisements, and search results that match the favor and demand of a user can be more effectively presented.

Regarding the function of the tag management unit 25 in the EC server 2, preferably, an effective tag, which is determined effective by a predetermined condition among tags corresponding to identification information of an assignment source, is additionally assigned to the identification information of an assignment destination in the tag mutual assignment process, so that a tag suitable for a user, a shop and merchandise is rendered dominant. Accordingly, reliability of the tag DB 8 in terms of content is improved.

Particularly, effective tag is determined as such appropriately, by managing at least a count of mutual assignment (assignment at the time of usual registration tag may also be counted). Tags are enriched by a large count of mutual assignment. Identical tag information that is assigned more than once is likely to match the preference of a user or a concept of merchandise and shop. Accordingly, such tag information is suitable to be treated as effective tag information.

Further, on acquiring user information, shop information, or merchandise information, the tag management unit executes a process of usual tag registration on the tag DB 8 (FIG. 6). That is, an occasion to assign tag information, other than mutual assignment, is provided. Such configuration provides an initial tag assignment occasion and a tag addition occasion prompted by acquisition of information such as user preference, a concept of a shop and merchandise. Thus, a tag may be added according to a change in preference.

Regarding the functions of the tag processing unit 26, when extracting tag or identification information for search or presentation information from a tag database, the tag processing unit 26 preferably targets effective tag information that is determined as effective by a predetermined condition. Such configuration is preferable, since mutual assignment may assigns tag information unsuitable for a user, a shop or merchandise on the tag database. Thus, execution of a process targeting effective tag information improves reliability of the acquiring process of tag information and identification information for generating presentation information.

Further, in such case, effective tag information is determined based on a count of mutual assignment (assignment at the time of usual registration tag may also be counted) represented by a tag point, so that a tag suitable for a user, a shop or merchandise is determined and used as effective tag information.

The Tag Use Process Examples I to V describe examples where a tag processing unit 26 extracts the tag or the identification information for generating the presentation information.

In the Tag Use Process Example I (FIG. 10), the tag processing unit 26 extracts a tag corresponding to the user ID related to a tag process target action from the tag DB 8, and acquires a shop ID or a merchandise ID that has a common tag identical to the extracted tag, as identification information used for generating presentation information.

Accordingly, under a situation where only a user ID is known among IDs related to a tag process target action, a shop ID or a merchandise ID suitable for a user can be acquired and put to use for information presentation. For example, presentation of a shop or merchandise a user desires to browse (recommendation presentation, advertisement, and the like) is enabled. Thus, a user is provided with an occasion to select a desirable shop or merchandise.

In the Tag Use Process Example II (FIG. 12) the tag processing unit 26 extracts a tag common between user ID related to a tag process target action and either a shop ID or a merchandise ID identification, and then acquires shop identification information or merchandise identification information that has tag information identical to the extracted tag, as identification information used for generating presentation information.

Accordingly, under a situation where the user ID and the shop/merchandise ID related to a tag process target action are known, a shop ID or a merchandise ID suitable for the user can be acquired and used as identification information for generating presentation information. Thus, an occasion is provided where a shop and merchandise that deals in merchandise or a concept favored by a user, which is estimated by a shop and merchandise browsed by a user.

In the tag Use Process Examples III and IV (see FIG. 13 and FIG. 15), the tag processing unit 26 extracts a tag corresponding to a user ID related to a tag process target action from the tag DB 8 and, the extracted tag is used for generating the presentation information.

Accordingly, under a situation where only a user ID is known among the IDs related to a tag process target action, a tag appropriate for a user can be acquired. For example, a suggestion word may be adjusted for a user and a tag is reflected to a search result. Thus, for a user, search operability is improved and highly satisfactory presentation of a search result is enabled.

In the Tag Use Process Example V (FIG. 16), the tag processing unit 26 extracts a tag based on a shop ID or a merchandise ID related to the tag process target action from the tag DB 8, and the extracted tags is used for generating presentation information.

For example, in a case where search execution by a user or the like is assumed as a tag process target action, a merchandise tag and a shop tag can be extracted among merchandise and shop IDs as a search result. By reflecting such tag to a search result, the search result can be narrowed, sorted or manipulated in a similar manner using a tag. Thus, presentation of a search result reflecting a major attribute is realized.

The present invention is not limited to the examples in the embodiments, and various modifications are possible other than the above examples.

The configuration of the electronic commerce system is not limited to the example of FIG. 1. The EC server 2 may be realized as a complex including an electronic commerce web page supply server, a management server, an advertisement server, a search server, a tag process server, and the like.

A tag process target action and a process examples targeted by the tag processing unit 26 are not limited to the examples of the Tag Use Process Examples I to V, and other variations are conceivable. That is, any process qualifies, that extracts a tag or identification information from the tag DB 8, triggered by a tag process target action, and then generates a page data to be presented in the user terminal 5, using the tag or the identification information.

In the embodiments, the examples where a usual registration tag and a mutual assignment tag are distinguished for management are described. In such case, a usual registration tag may be fixedly treated as an effective tag. Further in that case, tag point management regarding a count of assignment need not be conducted.

In a case where a usual registration tag is not fixedly treated as an effective tag, a threshold value for the effective tag determination may be differentiated between a usual registration tag and a mutual assignment tag.

Meanwhile, a usual registration tag may not be distinguished from a mutual assignment tag. A tag assigned in either process is treated equally, and whether or not the tag is effective may be determined based on a tag point.

Regarding a tag point, a tag point may be counted by other kind of points such as the count of sales or the count of a click, other than the count of assignment. Alternatively, a tag point may be weighed considering various situations.

For example, regarding a tag point of a user tag assigned to a merchandise ID and a shop ID by mutual assignment, an addition point may be varied in the following manner: an addition point is "one" for mutual assignment target action, an addition point is "two" for favorite registration, and an addition point is "three" for purchase.

Further, a tag registration process (the process of a usual registration tag) as shown in FIG. 6 need not target all of the user tag DB 8a, the shop tag DB 8b, and the merchandise tag DB 8c.

For example, the processes in FIG. 6 (S101, S104, S105, and S106) are not executed on the user tag DB 8a. Then, for example, an initial tag may be assigned to a shop ID and a merchandise ID as a usual registration tag, and the tag is spread to users, merchandise and shops by mutual assignment. Alternatively, an initial tag may be assigned only to a user ID in the processes in FIG. 6 (S101, S104, S105, and S106), and the processes in FIG. 6 (S102, S103, S107 to S112) are configured not to be executed for a shop and merchandise. That is, latter is an example where a user tag is spread to shops and merchandise by mutual assignment.

To avoid an excessive increase in the kinds of tags, the tags to be registered may be limited to some extent. For example, a word to be used as the tags may be preliminarily determined to, for example, 300 kinds, only the 300 kinds of words may be used as the tags.

The kinds of the tags may be specified by a merchandise category or the like.

In the embodiment, the mutual assignment of tags between a user and merchandise, and between a user and a shop is executed. However, mutual assignment of tags is conceivable, for example, between a user and a user, between merchandise and a shop, between merchandise and merchandise, and between a shop and a shop.

For example, mutual assignment may be configured to be executed on a platform such as SNS (Social Network Service) by requesting tag assignment by a user to another user. Further, mutual assignment between a shop and merchandise in deal, mutual assignment among merchandise in a series, mutual assignment between affiliated shops, and the like are conceivable.

7. Programs and Storage Medium

The EC server 2 as the embodiments of the information processing device of the present invention is described above. The program of the embodiments is a program that causes an information processing device (CPU or a similar unit) to execute the processing as the EC server 2.

A program of the embodiments is a program that causes the information processing device to manage the tag DB 8 that stores tags corresponding to respective pieces of identification information as a user ID of individual users, a shop ID of individual shops operating on the electronic commerce system, and a merchandise ID of individual pieces of merchandise provided for the electronic commerce system. The program causes the information processing device to execute a step of detecting a mutual assignment target action in a user terminal 5, and a step of executing a mutual assignment process in response to a mutual assignment target action, realizing a state where tag information is mutually assigned between a user ID and either a shop ID or a merchandise ID related to the mutual assignment target action. That is, the program causes the tag management unit 25 to execute the processes in FIG. 8.

A program according to the embodiment is a program that causes the information processing device to execute processing using the tag DB 8. The program causes the information processing device to execute a tag processing step of, in response to a tag process target action in the user terminal 5, searching the tag database for tag information corresponding to a user ID, a shop ID, or a merchandise ID related to the tag process target action, and acquiring, based on extracted tag information, tag information or identification information that is used for generating presentation information to be transmitted to the user terminal 5, and a presentation information generating step of, using the tag information or identification information acquired by the tag processing step, generating the presentation information to be transmitted to the user terminal. That is, the program causes the information processing device to execute the processes described in FIG. 10, FIG. 12, FIG. 13, FIG. 15, and FIG. 16.

This program achieves the information processing device as the above-described EC server 2.

Such program can be preliminary recorded in an HDD as a recording medium built into a device, such as a computer device, a ROM in a microcomputer including a CPU, or a similar medium. Alternatively, a removable recording medium, such as a semiconductor memory, a memory card, an optical disk, a magneto-optical disk, or a magnetic disk, can store (record) the program temporarily or permanently. Such removable recording medium can be provided as so-called package software. Such program can be installed from a removable recording medium to a personal computer or a similar device. Such removable recording medium can be provided as so-called package software. Such program can be installed from a removable recording medium to a personal computer or a similar device.

REFERENCE SIGNS LIST

1 network
2 EC server
4 shop terminal
5 user terminal
6 electronic commerce DB
8 tag DB
8a user tag DB
8b shop tag DB
8c merchandise tag DB
21 communication unit
22 web server
23 management unit
24 search unit
25 tag management unit
26 tag processing unit

What is claimed is:

1. An information processing device comprising:
   at least one memory configured to store program code; and
   at least one processor configured to access said at least one memory and operate according to said program code, said program code including:
   tag management code configured to cause at least one of said at least one processor to execute a tag mutual assignment process on a tag database that stores tag information corresponding to respective user identification information of an individual user, shop identification information of an individual shop operating in an electronic commerce system, and merchandise identification information of an individual piece of merchandise provided for the electronic commerce system, the tag management code configured to cause, in response to a mutual assignment target action from a user terminal, the at least one processor to register a first tag corresponding to the individual user in a non-user portion of the tag database and register a second tag corresponding to either the individual shop or the individual piece of merchandise in a user portion of the tag database associated with the individual user;

tag processing code configured to cause at least one of said at least one processor to search tag information corresponding to the user identification information, the shop identification information or the merchandise identification information based on the tag database, each of the identification information being related to a tag process target action in response to the tag process target action from the user terminal, and to acquire tag information or identification information that is used for generating presentation information to be transmitted to the user terminal based on extracted tag information; and presentation information generating code configured to cause at least one of said at least one processor to generate presentation information to be transmitted to the user terminal using the tag information or identification information acquired by the tag processing code, wherein the tag management code is configured to cause the at least one of said at least one processor to manage a count of assignment by the tag mutual assignment process regarding respective tag information corresponding to identification information, and to manage effective tag information to be registered with identification information of the first tag corresponding to the individual user or with identification information of the second tag corresponding to either the individual shop or to the individual piece of merchandise, the effective tag information being determined as effective based on the count of assignment exceeding a pre-determined threshold.

2. The information processing device according to claim 1, wherein
the tag management code is further configured to cause the at least one of said at least one processor to execute an addition process of tag information to the tag database on acquiring user information, shop information, or merchandise information.

3. The information processing device according to claim 1, wherein
the tag processing code is further configured to cause the at least one of said at least one processor to extract the effective tag information that is determined effective by a predetermined condition among a plurality of pieces of tag information corresponding to identical identification information from the tag database, and to acquire tag information or identification information that is used for generating presentation information based on the extracted effective tag information.

4. The information processing device according to claim 3, wherein
the tag processing code is further configured to cause the at least one of said at least one processor to determine whether or not a plurality of pieces of respective tag information corresponding to an identical identification information is effective tag information, based on the count of assignment.

5. The information processing device according to claim 1, wherein
the tag processing code is further configured to cause the at least one of said at least one processor to extract tag information corresponding to user identification information related to the tag process target action from the tag database, and to acquire shop identification information or merchandise identification information that has tag information common to the extracted tag information, as identification information used for generating presentation information.

6. The information processing device according to claim 1, wherein
the tag processing code is further configured to cause the at least one of said at least one processor to extract tag information common between user identification information related to the tag process target action and either shop identification information or merchandise identification related to the tag process target action from the tag database, and to acquire another shop identification information or merchandise identification information that has tag information common to the extracted tag information, as identification information used for generating presentation information.

7. The information processing device according to claim 1, wherein
the tag processing code is further configured to cause the at least one of said at least one processor to extract tag information corresponding to user identification information related to the tag process target action from the tag database, and to set the extracted tag information as tag information used to generate presented information.

8. The information processing device according to claim 1, wherein
the tag processing code is further configured to cause the at least one of said at least one processor to extract tag information from the tag database based on shop identification information or merchandise identification information related to the tag process target action, and to set the extracted tag information as tag information used to generate presented information.

9. An information processing device comprising:
at least one memory configured to store program code; and
at least one processor configured to access said at least one memory and operate according to said program code, said program code including:
detecting code configured to cause at least one of said at least one processor to detect a mutual assignment target action from a user terminal; and
tag management code configured to cause at least one of said at least one processor to execute a tag mutual assignment process on a tag database that stores tag information corresponding to respective user identification information of an individual user, shop identification information of an individual shop operating in an electronic commerce system, and merchandise identification information of an individual piece of merchandise provided for the electronic commerce system, the tag management code configured to cause, in response to detection of a mutual assignment target action from the user terminal, the at least one processor to register a first tag corresponding to the individual user in a non-user portion of the tag database and register a second tag corresponding to either the individual shop or the individual piece of merchandise in a user portion of the tag database associated with the individual user, wherein the tag management code is further configured to cause the at least one of said at least one processor to manage a count of assignment by the tag mutual assignment process regarding respective tag information corresponding to identification information, and to manage effective tag information to be registered with identification information of the first tag corresponding to the individual user or with identification information of the second tag corresponding to either the individual shop or to the individual piece of merchandise, the effective tag information being determined as effective based on the count of assignment exceeding a pre-determined threshold.

10. An information processing device for executing a tag mutual assignment process on a tag database, the tag database being configured to store tag information corresponding to respective user identification information of an individual user, shop identification information of an individual shop operating in an electronic commerce system, and merchandise identification information of an individual piece of merchandise provided for the electronic commerce system, the tag database being configured to manage a count of assignment by the tag mutual assignment process regarding respective tag information corresponding to identification information, the information processing device comprising:

at least one memory configured to store program code; and at least one processor configured to access said at least one memory and operate according to said program code, said program code including:

tag management code configured to cause, in response to a mutual assignment target action from a user terminal, the at least one processor to register a first tag corresponding to the individual user in a non-user portion of the tag database and register a second tag corresponding to either the individual shop or the individual piece of merchandise in a user portion of the tag database associated with the individual user;

tag processing code configured to cause at least one of said at least one processor to search tag information corresponding to the user identification information, the shop identification information or the merchandise identification information based on the tag database, each of the identification information being related to a tag process target action in response to the tag process target action from the user terminal, and to acquire tag information or identification information that is used for generating presentation information to be transmitted to the user terminal based on extracted tag information; and presentation code configured to cause at least one of said at least one processor to generate presentation information to be transmitted to the user terminal using the tag information or identification information acquired by the tag processing code, wherein the tag processing code is further configured to cause the at least one of said at least one processor to extract the effective tag information that is determined effective based on the count of assignment among a plurality of pieces of tag information corresponding to identical identification information from the tag database, and to acquire tag information or identification information that is used for generating presentation information based on the extracted effective tag information.

11. An information processing method of an information processing device that manages a tag database that stores tag information corresponding to respective user identification information of an individual user, shop identification information of an individual shop operating in an electronic commerce system, and merchandise identification information of an individual piece of merchandise provided for the electronic commerce system, the information processing method comprising:

a step of detecting a mutual assignment target action from a user terminal;

a step of executing, in response to the mutual assignment target action, a tag mutual assignment process comprising:

registering a first tag corresponding to the individual user in a non-user portion of the tag database, and registering a second tag corresponding to either the individual shop or the individual piece of merchandise in a user portion of the tag database associated with the individual user; and a step of managing a count of assignment by the tag mutual assignment process regarding respective tag information corresponding to identification information, wherein in the tag mutual assignment process, the effective tag information is registered with identification information of the first tag corresponding to the individual user or with identification information of the second tag corresponding to either the individual shop or to the individual piece of merchandise, the effective tag information being determined as effective based on the count of assignment exceeding a pre-determined threshold.

12. An information processing method of an information processing device that executes a tag mutual assignment process on a tag database, the tag database being configured to store tag information corresponding to respective user identification information of an individual user, shop identification information of an individual shop operating in an electronic commerce system, and merchandise identification information of an individual piece of merchandise provided for the electronic commerce system, the tag mutual assignment process comprising:

registering, in response to a mutual assignment target action from a user terminal, a first tag corresponding to the individual user in a non-user portion of the tag database and registering, in response to the mutual assignment target action from the user terminal, a second tag corresponding to either the individual shop or the individual piece of merchandise in a user portion of the tag database associated with the individual user, the tag database being configured to manage a count of assignment by the tag mutual assignment process regarding respective tag information corresponding to identification information, the information processing method comprising:

a tag processing step of searching tag information corresponding to the user identification information, the shop identification information or the merchandise identification information based on the tag database, each of the identification information being related to a tag process target action in response to the tag process target action from the user terminal, and acquiring tag information or identification information that is used for generating presentation information to be transmitted to the user terminal based on extracted tag information; and a presentation information generating step of generating presentation information to be transmitted to the user terminal using the tag information or identification information acquired by the tag processing step, wherein in the tag processing step, the effective tag information that is determined effective based on the count of assignment among a plurality of pieces of tag information corresponding to identical identification information from the tag database is extracted, and tag information or identification information that is used for generating presentation information based on the extracted effective tag information is acquired.

13. The information processing method of claim 11, further comprising:

deleting the first tag or the second tag when a corresponding count of assignment is lower than a predetermined value.

14. The information processing method of claim 11, further comprising:

deleting the first tag or the second tag when a corresponding count of assignment is lower than a predetermined value and a predetermined period since a latest assignment time point has passed.

15. The information processing method of claim 11, further comprising:

deleting the first tag or the second tag when a predetermined period since a latest assignment time point has passed.

16. The information processing method of claim 11, further comprising:

subtracting a numerical value of one from, for the first tag or the second tag, a corresponding count of assignment; and deleting the first tag or the second tag when the corresponding count of assignment is zero.

17. The information processing device of claim 1, wherein:

the information processing device is coupled to each of a user database, a shop database, and a merchandise database, and the presentation information generating code is further configured to acquire the identification information acquired by the tag processing code from at least one of the user database, the shop database, and the merchandise database.

* * * * *